(12) United States Patent
Yoo et al.

(10) Patent No.: US 11,523,128 B2
(45) Date of Patent: Dec. 6, 2022

(54) VIDEO DECODING METHOD AND APPARATUS USING RESIDUAL REARRANGEMENT IN VIDEO CODING SYSTEM

(71) Applicant: LG ELECTRONICS INC., Seoul (KR)

(72) Inventors: Sunmi Yoo, Seoul (KR); Jin Heo, Seoul (KR); Junghak Nam, Seoul (KR); Ling Li, Seoul (KR); Jangwon Choi, Seoul (KR); Jungah Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/418,122

(22) PCT Filed: Dec. 27, 2019

(86) PCT No.: PCT/KR2019/018599
§ 371 (c)(1),
(2) Date: Jun. 24, 2021

(87) PCT Pub. No.: WO2020/139016
PCT Pub. Date: Jul. 2, 2020

(65) Prior Publication Data
US 2022/0078455 A1 Mar. 10, 2022

Related U.S. Application Data

(60) Provisional application No. 62/785,674, filed on Dec. 27, 2018.

(51) Int. Cl.
*H04N 19/40* (2014.01)
*H04N 19/129* (2014.01)
(Continued)

(52) U.S. Cl.
CPC ........... *H04N 19/40* (2014.11); *H04N 19/129* (2014.11); *H04N 19/13* (2014.11); *H04N 19/132* (2014.11);
(Continued)

(58) Field of Classification Search
CPC ...... H04N 19/12; H04N 19/129; H04N 19/13; H04N 19/132; H04N 19/157; H04N 19/176; H04N 19/18; H04N 19/40; H04N 19/88
See application file for complete search history.

(56) References Cited

U.S. PATENT DOCUMENTS

2008/0013624 A1* 1/2008 Han ..................... H04N 19/59
375/240.18
2013/0051475 A1* 2/2013 Joshi ................... H04N 19/625
375/240.18
(Continued)

FOREIGN PATENT DOCUMENTS

KR 20130029130 A 3/2013
KR 20150091043 A 8/2015
(Continued)

OTHER PUBLICATIONS

Zhouye Gu, Weisi Lin, Bu-sung Lee and Chiew Tong Lau, "Improve H.264/AVC lossless coding by coefficients reordering," 2012 19th International Conference on Systems, Signals and Image Processing (IWSSIP), 2012, pp. 397-400.*

*Primary Examiner* — Mohammed S Rahaman
(74) *Attorney, Agent, or Firm* — Dentons US LLP

(57) ABSTRACT

A video decoding method performed by a decoding device according to the present document comprises the steps of: entropy decoding residual information for a current block to derive residual coefficients for the current block; rearranging the residual coefficients; deriving residual samples of the
(Continued)

current block on the basis of the rearranged residual coefficients; and restoring a current picture on the basis of the residual samples.

6 Claims, 21 Drawing Sheets

(51) Int. Cl.
*H04N 19/13* (2014.01)
*H04N 19/132* (2014.01)
*H04N 19/176* (2014.01)
*H04N 19/18* (2014.01)
*H04N 19/88* (2014.01)

(52) U.S. Cl.
CPC ......... *H04N 19/176* (2014.11); *H04N 19/18* (2014.11); *H04N 19/88* (2014.11)

(56) References Cited

U.S. PATENT DOCUMENTS

| | | | |
|---|---|---|---|
| 2015/0312571 A1* | 10/2015 | Kim | H04N 19/187 375/240.03 |
| 2017/0289548 A1* | 10/2017 | Kim | H04N 19/122 |
| 2018/0027240 A1 | 1/2018 | Huang et al. | |
| 2019/0149823 A1* | 5/2019 | Lim | H04N 19/70 375/240.03 |
| 2019/0313102 A1* | 10/2019 | Cho | H04N 19/132 |
| 2020/0288134 A1* | 9/2020 | Lim | H04N 19/129 |
| 2021/0014527 A1* | 1/2021 | Iwamura | H04N 19/137 |

FOREIGN PATENT DOCUMENTS

| | | |
|---|---|---|
| KR | 20170044630 A | 4/2017 |
| KR | 101814308 B1 | 1/2018 |

* cited by examiner

FIG. 9
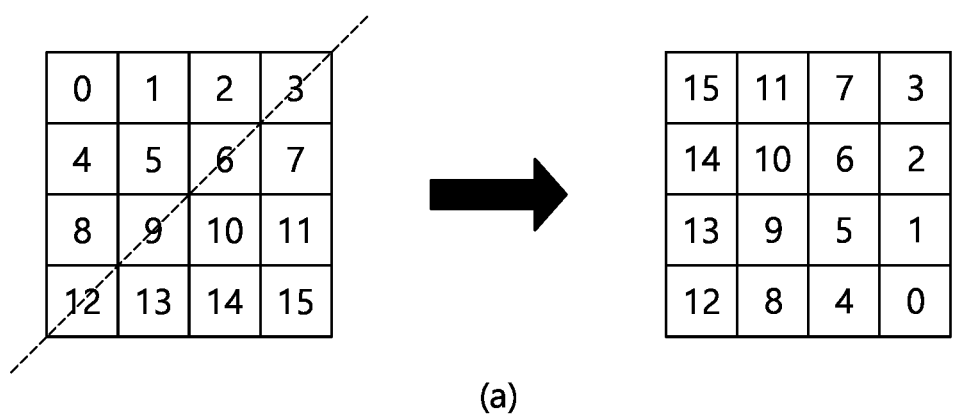
(a)
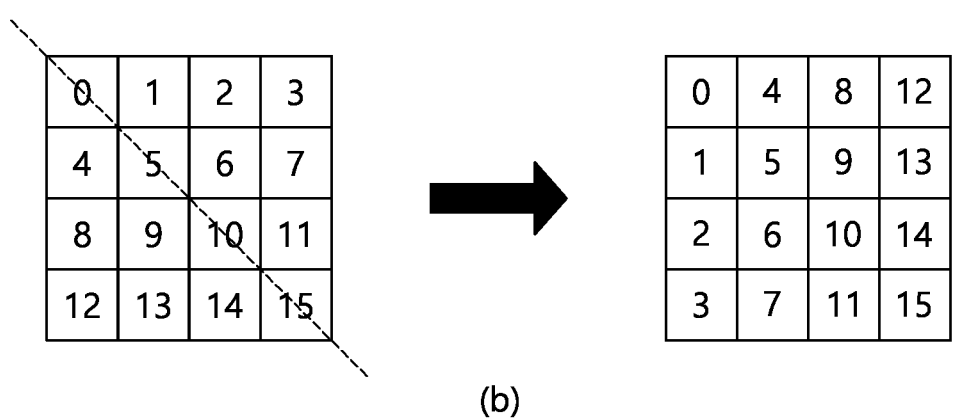
(b)

FIG. 10
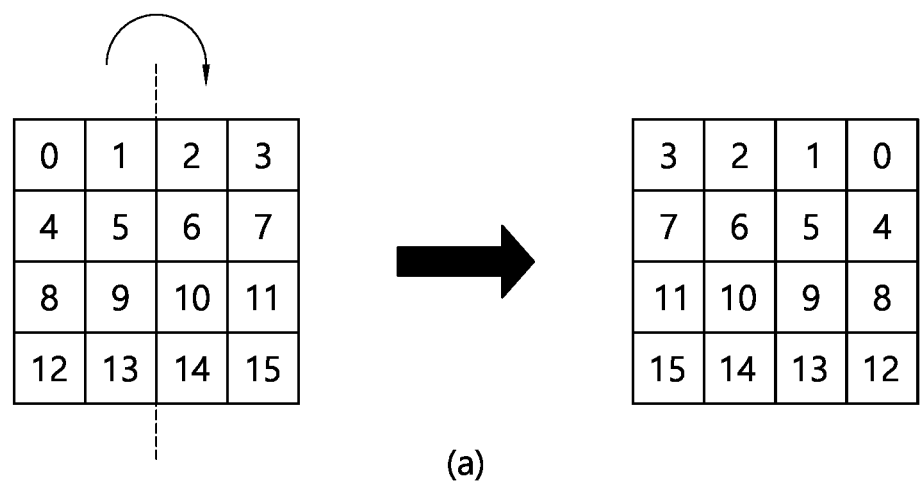
(a)
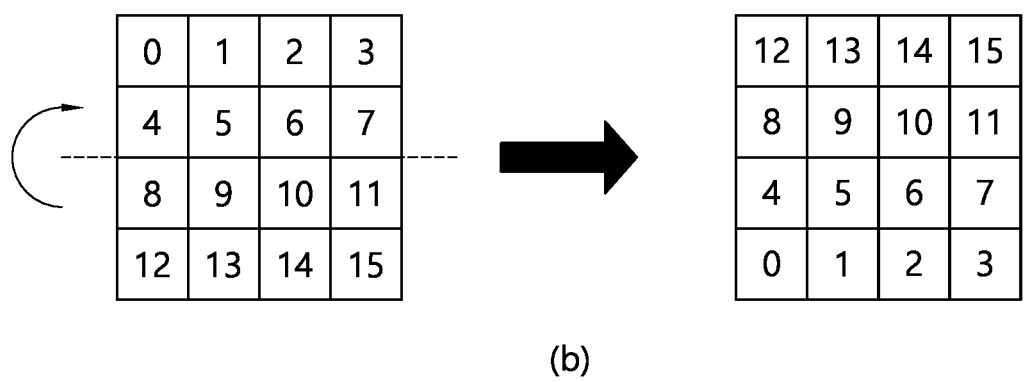
(b)

FIG. 11
(a)
(b)

FIG. 12
(a)
(b)

FIG. 13
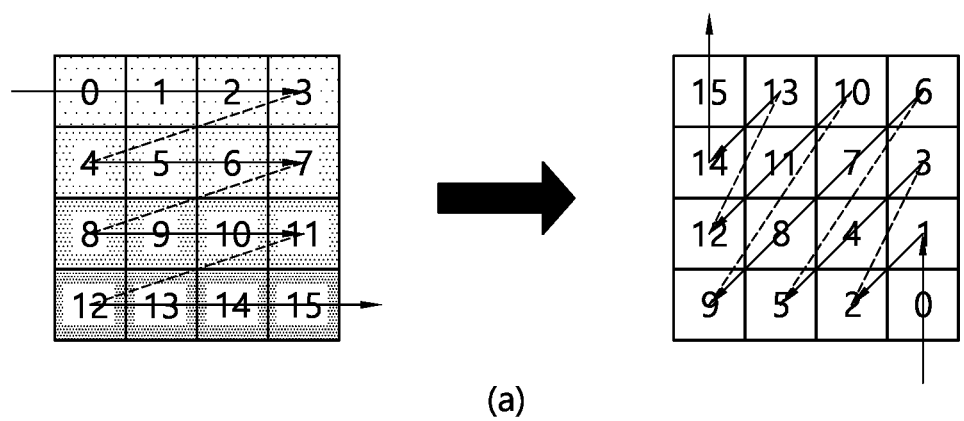
(a)
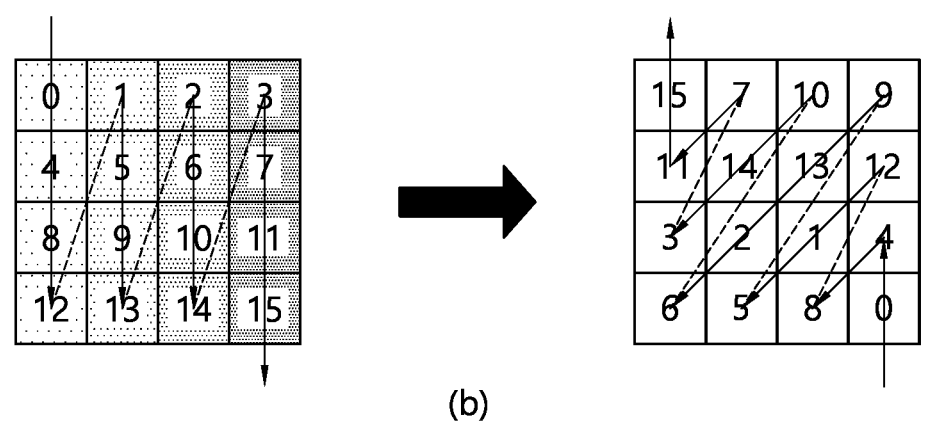
(b)

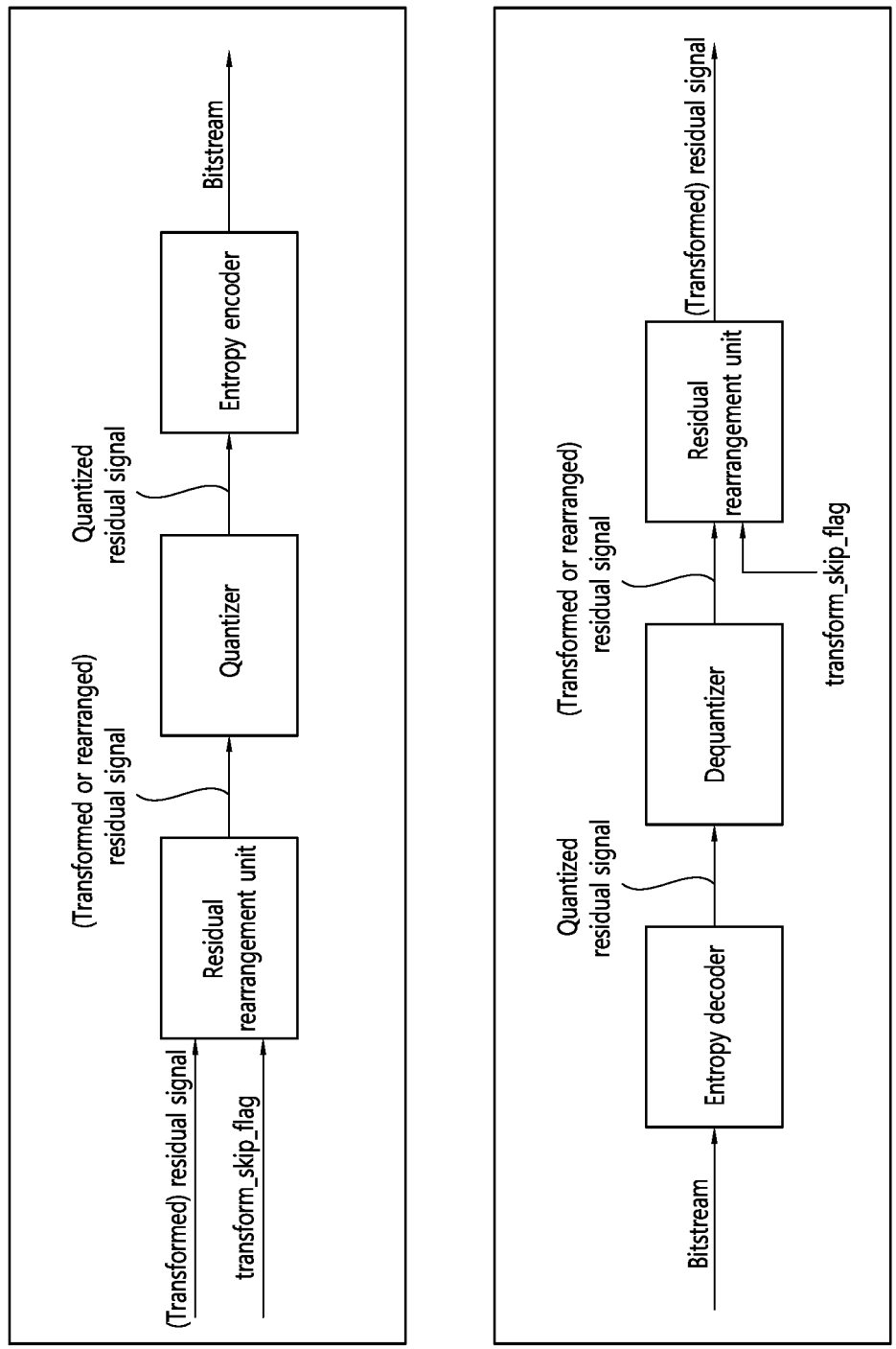

VIDEO DECODING METHOD AND APPARATUS USING RESIDUAL REARRANGEMENT IN VIDEO CODING SYSTEM

CROSS-REFERENCE TO RELATED APPLICATION

This application is the National Stage filing under 35 U.S.C. 371 of International Application No. PCT/KR2019/018599, filed Dec. 27, 2019, which claims priority to and the benefit of U.S. Provisional Application No. 62/785,674, filed on Dec. 27, 2018, the disclosure of which is incorporated herein by reference in its entirety.

BACKGROUND OF THE DISCLOSURE

Field of the Disclosure

The present disclosure relates to an image coding technology and, more particularly, to an image decoding method and apparatus for coding residual information using residual rearrangement in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and apparatus for improving efficiency of residual coding.

Yet another technical object of the present disclosure is to provide a method and apparatus for rearranging residual coefficients in coding residual information.

According to one embodiment of the present disclosure, an image decoding method performed by a decoding apparatus is provided. The method comprises deriving residual coefficients for a current block by entropy decoding residual information for the current block, rearranging the residual coefficients, deriving residual samples of the current block based on the rearranged residual coefficients; and reconstructing a current picture based on the residual samples.

According to another one embodiment of the present disclosure, a decoding apparatus performing image decoding is provided. The decoding apparatus comprises an entropy decoder entropy decoding residual information for a current block and deriving residual coefficients for the current block; a residual rearrangement unit deriving residual samples of the current block based on the rearranged residual coefficients; and an adder reconstructing a current picture based on the residual samples.

According to yet another one embodiment of the present disclosure, an image encoding method performed by an encoding apparatus is provided. The method comprises deriving residual coefficients of a current block, rearranging the residual coefficients, generating residual information for the current block by entropy encoding the rearranged residual coefficients, and outputting a bitstream including the residual information.

According to still another one embodiment of the present disclosure, an image encoding apparatus is provided. The encoding apparatus comprises a subtractor deriving residual coefficients of a current block, a residual rearrangement unit rearranging the residual coefficients, and an entropy encoder generating residual information for the current block by entropy encoding the rearranged residual coefficients and outputting a bitstream including the residual information.

Effects of the Disclosure

According to the present disclosure, the overall image/video compression efficiency may be improved.

According to the present disclosure, efficiency of residual coding may be improved.

According to the present disclosure, residual coefficients are rearranged and coded considering the lack of correlation between residual coefficients in the pixel domain in which a transformation process is not performed, through which residual coding efficiency may be improved.

BRIEF DESCRIPTION OF THE DRAWINGS

FIG. 9 illustrates residual coefficients of a current block to which a mirroring rearrangement method is applied.

FIG. 10 illustrates residual coefficients of a current block to which a flip rearrangement method is applied.

FIG. 11 illustrates residual coefficients of a current block to which the embodiment is applied, which derives a layer divided based on a distance from a reference sample and rearranges the residual coefficients at positions in inverse raster order.

FIG. 12 illustrates residual coefficients of a current block to which the embodiment is applied, which derives a layer divided based on a distance from a reference sample and rearranges the residual coefficients at positions in diagonal scan order.

FIG. 13 illustrates residual coefficients of a current block to which the embodiment is applied, which derives a layer divided based on a distance from a specific reference sample and rearranges the residual coefficients at positions in diagonal scan order.

FIGS. 14a and 14b illustrate an embodiment for determining whether to apply the rearrangement method based on a transform skip flag for the current block and an encoding apparatus and a decoding apparatus performing the embodiment.

DESCRIPTION OF EXEMPLARY EMBODIMENTS

Figure 1:
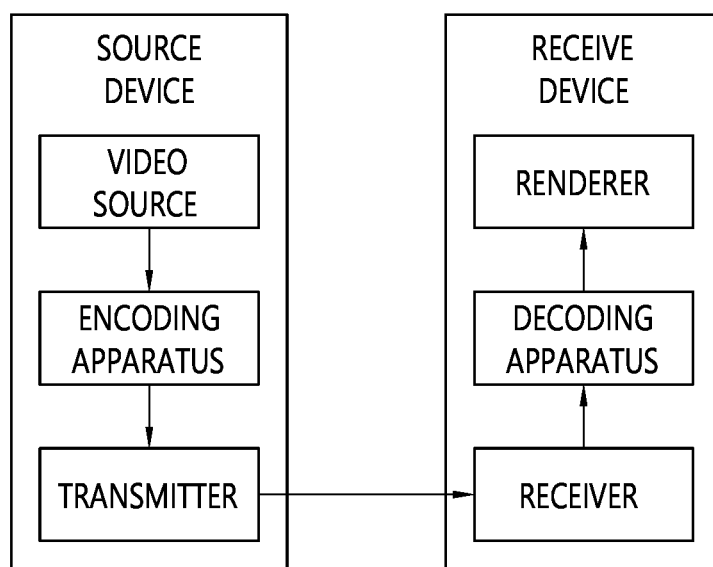
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
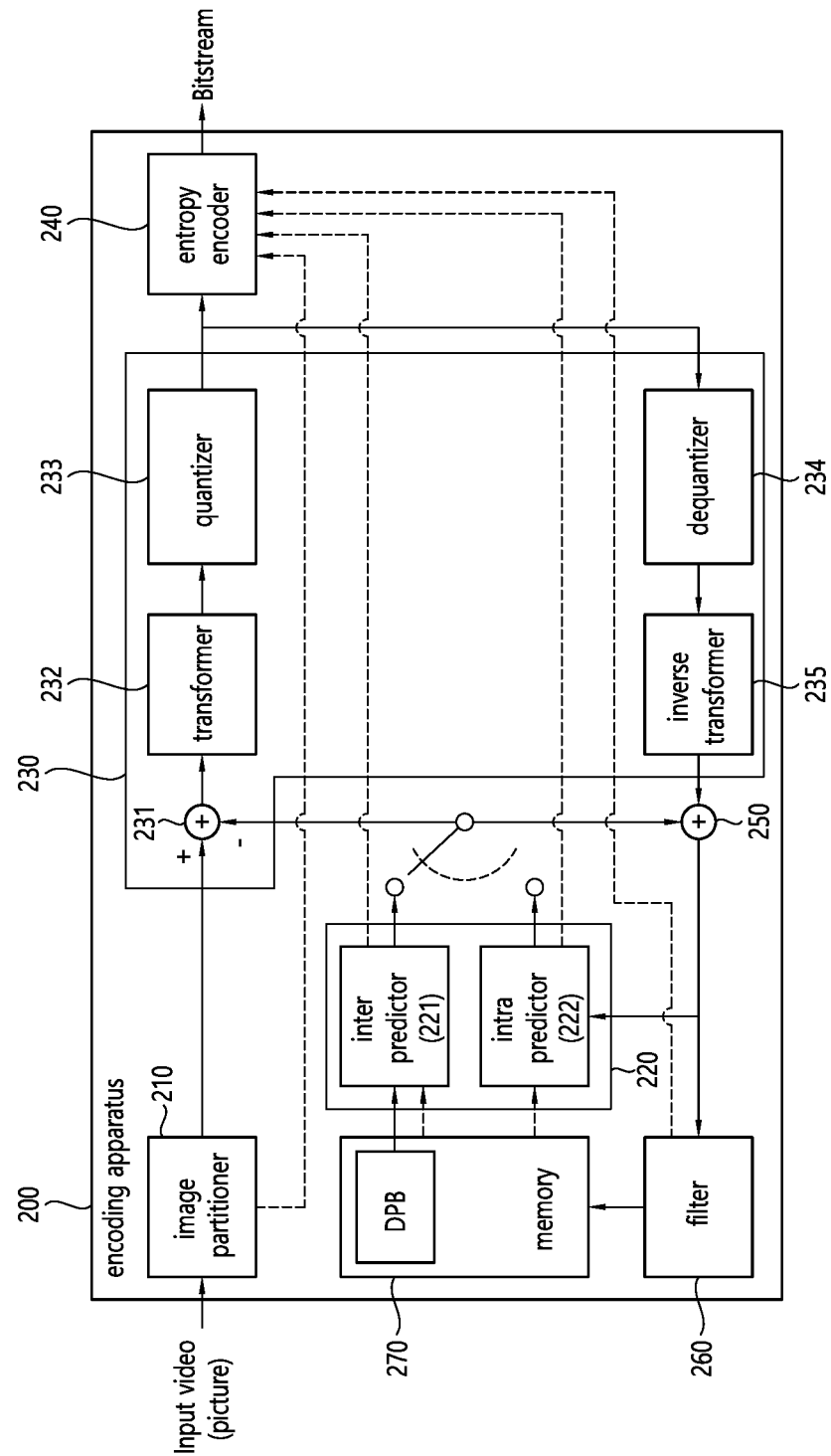
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
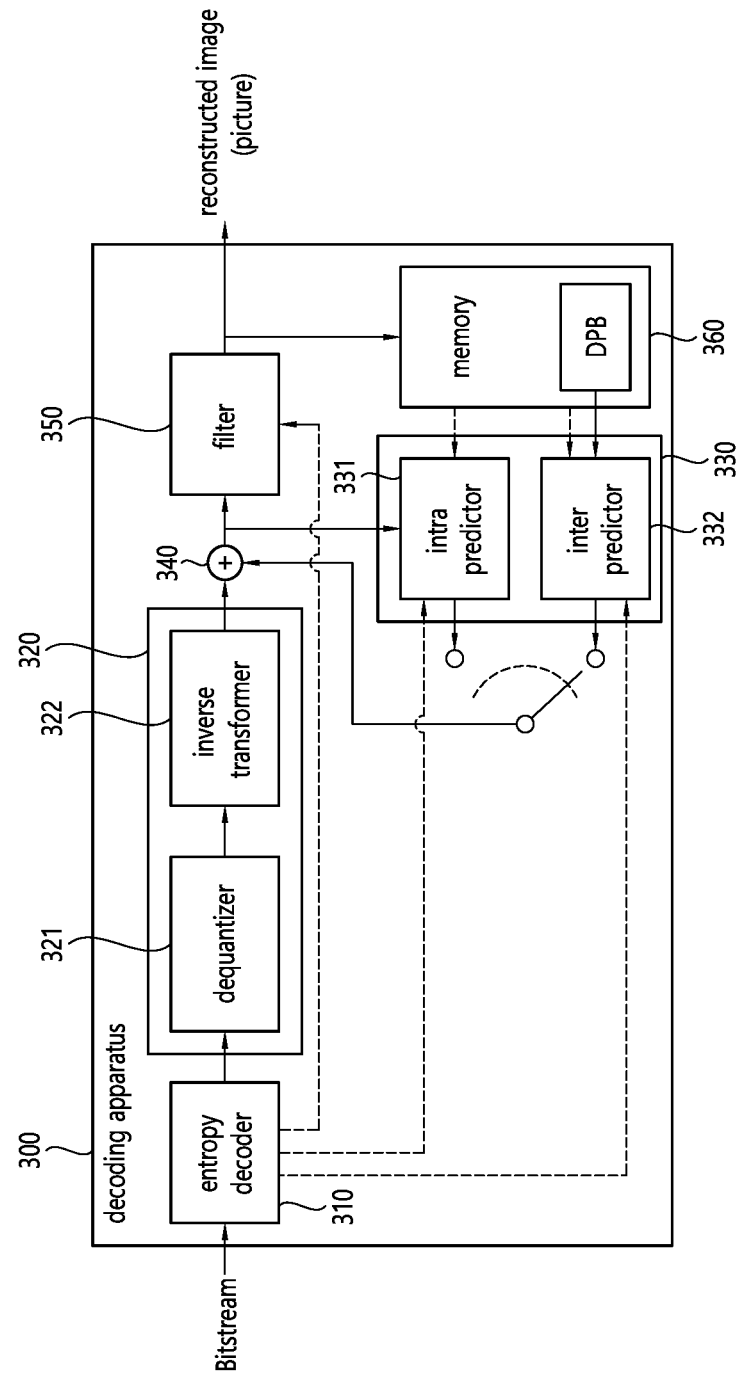
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 4:
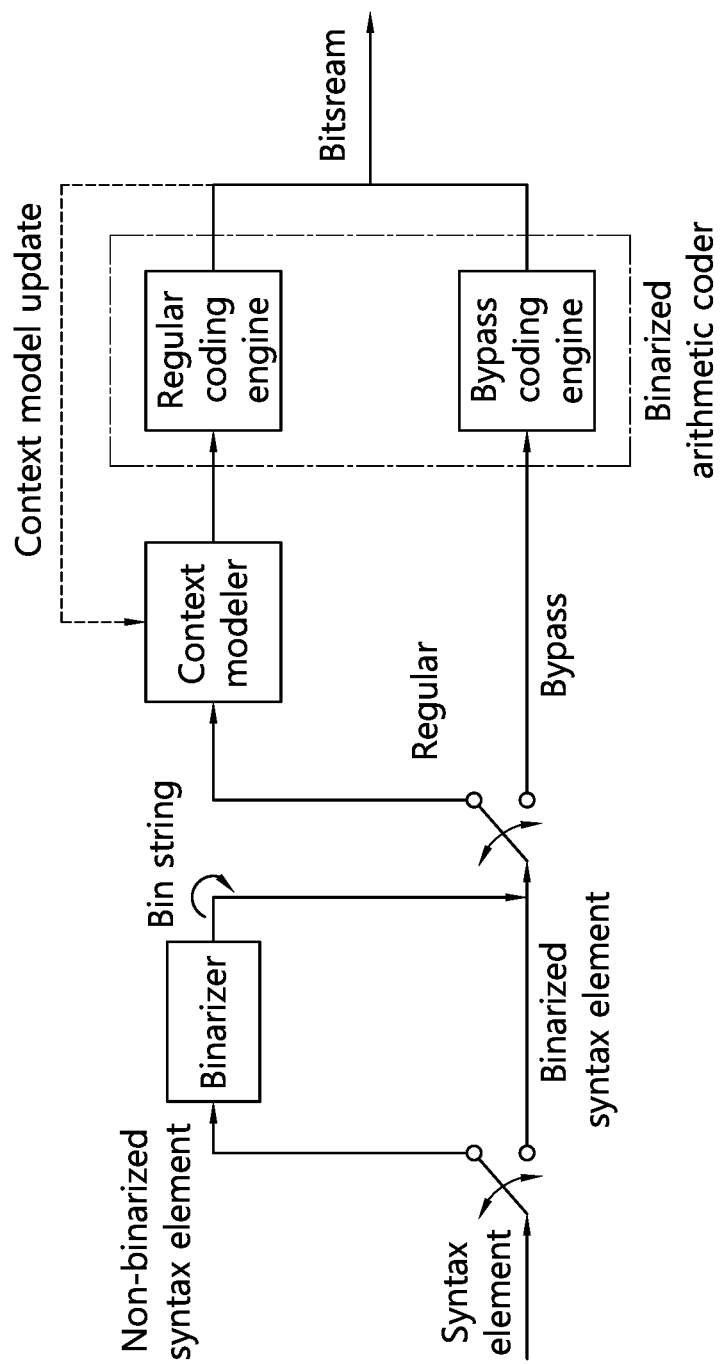
FIG. 4 exemplarily shows context-adaptive binary arithmetic coding (CABAC) for encoding a syntax element.

FIG. 4 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, the (quantized) transformation coefficients (i.e., the residual information) may be encoded and/or decoded based on syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, dec_abs_level, mts_idx. Syntax elements related to residual data encoding/decoding may be represented as shown in the following table.

TABLE 1

| residual coding( x0, y0, log2TbWidth, log2TbHeight, cIdx ) { | Descriptor |
|---|---|
| if( transform_skip_enabled_flag && ( cIdx != 0 | | tu_mts_flag[ x0 ][ y0 ] = = 0 ) && ( log2TbWidth <= 2) && ( log2TbHeight <= 2 ) ) | |
|    transform_skip_flag[ x0 ][ y0 ][ cIdx ] | ae(v) |
| last_sig_coeff_x_prefix | ae(v) |
| last_sig_coeff_y_prefix | ae(v) |
| if( last sig coeff x prefix > 3 ) | |
|    last_sig_coeff_x_suffix | ae(v) |
| if( last sig coeff y prefix > 3 ) | |
|    last_sig_coeff_y_suffix | ae(v) |
| log2SbSize = ( Min( log2TbWidth, log2TbHeight ) < 2 ? 1 : 2) | |
| numSbCoeff = 1 << ( log2SbSize << 1 ) | |
| lastScanPos = numSbCoeff | |
| lastSubBlock = ( 1 << ( log2TbWidth + log2TbHeight − 2 * log2SbSize ) ) − 1 | |

TABLE 1-continued

| residual coding( x0, y0, log2TbWidth, log2TbHeight, cIdx ) { | Descriptor |
|---|---|
| ```
    do {
      if( lastScanPos == 0 ) {
        lastScanPos = numSbCoeff
        lastSubBlock- -
      }
      lastScanPos- -
      xS = DiagScanOrder[ log2TbWidth - log2SbSize ][ log2TbHeight - log2SbSize ]
            [ lastSubBlock ][ 0 ]
      yS = DiagScanOrder[ log2TbWidth log2SbSize ][ log2TbHeight - log2SbSize ]
            [ lastSubBlock ][ 1 ]
      xC = ( xS << log2SbSize ) +
           DiagScanOrder[ log2SbSize ][ log2SbSize ][ lastScanPos ][ 0 ]
      yC = ( yS << log2SbSize ) +
           DiagScanOrder[ log2SbSize ][ log2SbSize ][ lastScanPos ][ 1 ]
    } while( ( xC !- LastSignificantCoeffX ) | | ( yC !- LastSignificantCoeffY ) )
    numSigCoeff = 0
    QState = 0
    for( i = lastSubBlock; i >= 0; i- - ) {
      startQStateSb = QState
      xS = DiagScanOrder[ log2TbWidth - log2SbSize ][ log2TbHeight - log2SbSize ]
            [ lastSubBlock ][ 0 ]
      yS = DiagScanOrder[ log2TbWidth - log2SbSize ][ log2TbHeight - log2SbSize ]
            [ lastSubBlock ][ 1 ]
      inferSbDcSigCoeffFlag = 0
      if (i < lastSubBlock ) && ( i > 0 ) ) {
        coded_sub_block_flag [ xS ][ yS ]
``` | ae(v) |
| ```
        inferSbDcSigCoeffFlag = 1
      }
      firstSigScanPosSb = numSbCoeff
      lastSigScanPosSb = -1
      remBinsPass1 = ( log2SbSize < 2 ? 6 : 28 )
      remBinsPass2 = ( log2SbSize < 2 ? 2 : 4 )
      firstPosMode0 = ( i == lastSubBlock ? lastScanPos - 1 : numSbCoeff - 1 )
      firstPosMode1 = -1
      firstPosMode2 = -1
      for( n =(i == firstPosMode0; n >= 0 && remBinsPass1 >= 3; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( coded_sub_block_flag[ xS ][ yS ] && ( n > 0 | | !inferSbDcSigCoeffFlag ) ) {
          sig_coeff_flag [ xC ][ yC ]
``` | ae(v) |
| ```
          remBinsPass1- -
          if( sig_coeff_flag[ xC ][ yC ] )
            inferSbDcSigCoeffFlag = 0
        }
        if( sig_coeff_flag[ xC ][ yC ] ) {
          numSigCoeff |
          abs_level_gt1_flag[ n ]
``` | ae(v) |
| ```
          remBinsPass1- -
          if( abs_level_gt1_flag[ n ] ) {
            par_level_flag[ n ]
``` | ae(v) |
| ```
            remBinsPass1- -
            if( remBinsPass2 > 0) {
              remBinsPass2
              if( remBinsPass2 = = 0 )
                firstPosMode1 = n - 1
            }
          }
          if( lastSigScanPosSb = = 1 )
            lastSigScanPosSb = n
          firstSigScanPosSb = n
        }
        AbsLevelPass1[ xC ][ yC ] =
            sig coeff flag[ xC ][ yC ] + par level flag[ n ] + abs level gt1 flag[ n ]
        if( dep quant enabled flag )
           QState = QStateTransTable[ QState ][ AbsLevelPass1 [ xC ][ yC ] & 1 ]
        if( remBinsPass1 < 3 )
          firstPosMode2 = n - 1
      }
      if( firstPosMode1 < firstPosMode2 )
        firstPosMode1 = firstPosMode2
      for( n = numSbCoeff - 1; n >= firstPosMode2; n- - )
        if( abs level gt1 flag[ n ] )
          abs level gt3 flag[ n ]
``` | ae(v) |
| ```
      for( n = numSbCoeff - 1; n >= firstPosMode1; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs level gt3 flag[ n ] )
``` | |

TABLE 1-continued

| residual coding( x0, y0, log2TbWidth, log2TbHeight, cIdx ) { | Descriptor |
|---|---|
|       abs remainder[ n ] | ae(v) |
|       AbsLevel[ xC ][ yC ] = AbsLevelPass1 [ xC ][ yC ] + | |
|           2 * ( abs level gt3 flag[ n ] + abs remainder[ n ] ) | |
|    } | |
|    for( n = firstPosMode1; n > firstPosMode2; n- - ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( abs level gt1 flag[ 1 ] ) | |
|          abs remainder[ n ] | ae(v) |
|       AbsLevel[ xC ][ yC ] = AbsLevelPass1 [ xC ][ yC ] + 2 * abs remainder[ n ] | |
|    } | |
|    for( n = firstPosMode2; n >= 0; n- - ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       dec abs level[ n ] | ae(v) |
|       if(AbsLevel[ xC ][ yC ] > 0 ) | |
|          firstSigScanPosSb = n | |
|       if( dep quant enabled flag ) | |
|          QState - QStateTransTable[ QState ][ AbsLevel[ xC ][ yC ] & 1 ] | |
|    } | |
|    if( dep quant enabled flag | | !sign data hiding enabled flap ) | |
|       signHidden = 0 | |
|    else | |
|       signHidden = ( lastSigScanPosSb - firstSigScanPosSb > 3 ? 1 : 0 ) | |
|    for( n = numSbCoeff - 1; n >= 0; n- - ) { | |
|       xC = ( xS << log2SbSize ) +DiagScanOrder[ log2SbSize ][ log2SbSize ][ n ][ 0 ] | |
|       yC = ( yS << log2SbSize ) +DiagScanOrder[ log2SbSize ][ log2SbSize ][ n ][ 1 ] | |
|       if( sig_coeff_flag[ xC ][ yC ] && | |
|         ( !signHidden | | ( n != firstSigScanPosSb ) ) ) | |
|          coeff sign flag[ n ] | ae(v) |
|    } | |
|    if( dep quant enabled flag ) { | |
|       QState = startQStateSb | |
|       for( n = numSbCoeff - 1;n >= 0; n- - ) { | |
|          xC = ( xS << log2SbSize ) + | |
|             DiagScanOrder[ log2SbSize ][ log2SbSize ][ n ][ 0 ] | |
|          yC = ( yS << log2SbSize ) + | |
|             DiagScanOrder[ log2SbSize ][ log2SbSize ][ n ][ 0 ] | |
|          if( sig coeff flag[ xC ][ yC ] ) | |
|             TransCoeffLevel[ x0 ][ y0 ][ cIdx ][ xC ][ yC ] = | |
|               ( 2 * AbsLevel[ xC ][ yC ][ - ( QState > 1 ? 1 : 0 ) )* | |
|               ( 1 - 2 * coeff_sign_flag[ n ] ) | |
|          QState = QStateTransTable[ QState1 ][ par level flag[ n ] ] | |
|    } else { | |
|       sumAbsLevel = 0 | |
|       for( n = numSbCoeff 1; n >= 0; n  ) { | |
|          xC = ( xS << log2SbSize ) + | |
|             DiagScanOrder[ log2SbSize ][ log2SbSize ][ n ][ 0 ] | |
|          yC = ( yS << log2SbSize ) + | |
|             DiagScanOrder[ log2SbSize ][ log2SbSize ][ n ][ 0 ] | |
|          if( sig coeff flag[ xC ][ yC ] ) { | |
|             TransCoeffLevel[ x0 ][ y0 ][ cIdx ][ xC ][ yC ] = | |
|               AbsLevel[ xC ][ yC ] * ( 1 - 2 * coeff sign flag[ n ] ) | |
|             if(signHidden ) { | |
|               sumAbsLevel += AbsLevel[ xC ][ yC ] | |
|               if( ( n == firstSigScanPosSb ) && ( sumAbsLevel % 2 ) == 1 ) ) | |
|                  TransCoeffLevel[ x0 ][ y0 ][ cIdx ][ xC ][ yC ] = | |
|                   -TransCoeffLevel[ x0 ][ y0 ][ cIdx ][ xC ][ yC ] | |
|             } | |
|          } | |
|       } | |
|    } | |
|    } | |
|    if( tu mts flag[ x0 ][ y0 ] && ( cIdx == 0 ) ) | |
|       mts_iclx[ x0 ][ y0 ][ cIdx ] | ae(v) |
| } | | transform_skip_flag indicates whether transform is skipped in an associated block. The transform_skip_flag may be a syntax element of a transform skip flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$remAbsLevel = |coeff| - 1 \qquad [\text{Equation 1}]$$

Herein, coeff means an actual transform coefficient value.

Additionally, abs_level_gt1_flag may indicate whether or not remAbsLevel' of the corresponding scanning position (n) is greater than 1. For example, when the value of abs_level_gt1_flag is 0, the absolute value of the transform coefficient of the corresponding position may be 1. In addition, when the value of the abs_level_gt1_flag is 1, the remAbsLevel indicating the level value to be encoded later may be derived as shown in the following equation.

$$remAbsLevel = remAbsLevel - 1 \qquad [\text{Equation 2}]$$

In addition, the least significant coefficient (LSB) value of remAbsLevel described in Equation 2 described above may be encoded as in Equation 3 below through par_level_flag.

$$par\_level\_flag = remAbsLevel \,\&\, 1 \qquad [\text{Equation 3}]$$

Herein, par_level_flag[n] may indicate a parity of a transform coefficient level (value) at a scanning position n.

A transform coefficient level value remAbsLevel that is to be encoded after performing par_level_flag encoding may be updated as shown below in the following equation.

$$remAbsLevel' = remAbsLevel >> 1 \qquad [\text{Equation 4}]$$

abs_level_gt3_flag may indicate whether or not remAbsLevel' of the corresponding scanning position (n) is greater than 3. Encoding for abs_remainder may be performed only in a case where rem_abs_gt3_flag is equal to 1. A relationship between the actual transform coefficient value coeff and each syntax element may be as shown below in the following equation.

$$|coeff| = sig\_coeff\_flag + abs\_level\_gt1\_flag + par\_level\_flag + 2*(abs\_level\_gt3\_flag + abs\_remainder) \qquad [\text{Equation 5}]$$

Additionally, the following table indicates examples related to the above-described Equation 5.

TABLE 2

| \|coeff\| | sig_coeff_flag | abs_level_gt1_flag | par_level_flag | abs_level_gt3_flag | abs_remainder/dec_abs_level |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | | |

Herein, |coeff| indicates a transform coefficient level (value) and may also be indicates as an AbsLevel for a transform coefficient. Additionally, a sign of each coefficient may be encoded by using coeff_sign_flag, which is a 1-bit symbol.

In addition, the dec_abs_level may represent an intermediate value coded with a Golomb-Rice code at the corresponding scanning position (n). The dec_abs_level may be signaled for a scanning position that satisfies the conditions disclosed in Table 1 above. In this case, the absolute value AbsLevel (i.e., |coeff|) of the corresponding transform coefficient is derived as one of 0, dec_abs_level+1, dec_abs+level depending on the condition.

Also, the coeff_sign_flag may indicate the sign of the transform coefficient level at the corresponding scanning position (n). That is, the coeff_sign_flag may indicate the sign of the transform coefficient at the corresponding scanning position (n).

In addition, the mts_idx may indicate transform kernels applied in a horizontal direction and a vertical direction to residual samples in a current transform block.

Figure 5:
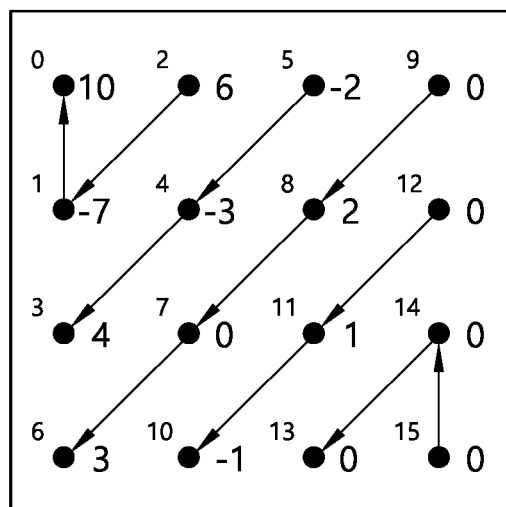
FIG. 5 is a diagram showing exemplary transform coefficients within a 4×4 block.

FIG. 5 illustrates an example of transform coefficients within a 4×4 block.

The 4×4 block of FIG. 5 illustrates one example of quantized coefficients. The block shown in FIG. 5 may be a 4×4 transform block or a 4×4 sub-block of 8×8, 16×16, 32×32, and 64×64 transform blocks. The 4×4 block of FIG. 5 may represent a luma block or a chroma block.

For example, the following table shows an encoding result for the inverse diagonally scanned coefficients illustrated in FIG. 5.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | | |
| abs_levelgt1_flag | | | | | 0 | 0 | | 1 | | 1 | 1 | 1 | 1 | 1 | | |
| par_level_flag | | | | | | | | 0 | | 1 | 0 | 1 | 0 | 0 | | |
| abs_level_gt3_flag | | | | | | | | | | | | | 1 | 1 | | |
| abs_remainder | | | | | | | | | | | | | 0 | 1 | | |
| dec_abs_level | | | | | | | | | | | | | | | 7 | 10 |
| coeff_sign_flag | 0 | 0 | 0 | 0 | 0 | 1 | 0 | 0 | 0 | 0 | 1 | 1 | 0 | 0 | 1 | 0 |

In Table 3, scan_pos represents the position of a coefficient according to the inverse diagonal scan. The scan_pos 15 may represent the transform coefficient scanned first in the 4×4 block, namely, the transform coefficient of the bottom-right corner, and scan_pos 0 may be the transform coefficient scanned last, namely, the transform coefficient of the top-left corner. Meanwhile, in one embodiment, the scan_pos may be referred to as a scan position. For example, the scan_pos 0 may be referred to as scan position 0.

Meanwhile, CABAC provides high performance but has a disadvantage of poor throughput performance. This characteristic is caused by the regular coding engine of the CABAC, where the regular coding (namely, encoding through the regular coding engine of the CABAC) uses a updated probabilistic state and range through coding of the previous bin, thereby showing high data dependency and taking a lot of time to read a probabilistic section and determine the current state. The CABAC's throughput problem may be solved by limiting the number of context-coded bins. For example, as shown in Table 1, the sum of bins used to express the sig_coeff_flag, the abs_level_gt1_flag, and the par_level_flag may be limited by a number depending on the size of the corresponding block. In one example, when the corresponding block is a 4×4 sized block, the sum of bins for the sig_coeff_flag, the abs_level_gt1_flag, and the par_level_flag may be limited to 28. On the other hand, when the corresponding block is a 2×2 sized block, the sum of bins for the sig_coeff_flag, the abs_level_gt1_flag, and the par_level_flag may be limited to 6. The remBinsPass1 may express the limited numbers of bins. Also, the numbers due to the size of the corresponding blocks may limit the number of context-coded bins for the abs_level_gt3_flag. For example, in the case of a 4×4 sized block, the number of bins for the abs_level_gt3_flag may be limited to 4 while, in the case of a 2×2 sized block, the number of bins for the abs_level_gt3_flag may be limited to 2. The remBinsPass2 may express the limited numbers of bins for the abs_level_gt3_flag. In this case, when the encoding apparatus uses all of the limited number of context-coded bins to code context elements, the remaining coefficients may be binarized without using the CABAC through a binarization method for the coefficients described later to perform bypass encoding.

Meanwhile, as described above, when an input signal is received in the form of a syntax element rather than a binary value, the encoding apparatus may convert the input signal into a binary value by binarization. Also, the decoding apparatus may decode the syntax element to derive a binarized value (namely, a binarized bin) of the syntax element and inversely binarize the binarized value to derive the value of the syntax element. The binarization process may be performed using a Truncated Rice (TR) binarization process, a k-th order Exp-Golomb (EGk) binarization process, or a Fixed Length (FL) binarization process. Also, the inverse binarization process may refer to a process of deriving the value of the syntax element by performing the TR binarization process, the EGk binarization process, or the FL binarization process.

For example, the TR binarization process may be performed as follows.

The input of the TR binarization process may be a request for TR binarization and cMax and cRiceParam for a syntax element. Also, an output of the TR binarization process may be TR binarization for a value symbolVal corresponding to a bin string.

Specifically, as one example, in the presence of a suffix bin string for a syntax element, a TR bin string for the syntax element may be a concatenation of a prefix bin string and a suffix bin string; in the absence of the suffix bin string, the TR bin string for the syntax element may be the prefix bin string. For example, the prefix bin string may be derived as follows.

A prefix value of the symbolVal for the syntax element may be derived to satisfy the following equation.

$$\text{prefixVal} = \text{symbolVal} >> \text{cRiceParam} \qquad \text{[Equation 6]}$$

In Eq. 6, prefixVal represents a prefix value of the symbolVal. The prefix (namely, a prefix bin string) of the TR bin string of the syntax element may be derived as follows.

For example, when the prefixVal is less than cMax>>cRiceParam, the prefix bin string may be a bit string of length prefixVal+1 indexed by binIdx. In other words, when the prefixVal is less than cMax>>cRiceParam, the prefix bin string may be a bit string having prefixVal+1 bits indicated by binIdx. The bin corresponding to binIdx less than prefixVal may be equal to 1. Also, the bin corresponding to binIdx having the same value as prefixVal may be equal to 0.

For example, bin strings derived through unary binarization for the prefixVal may be given as follows.

TABLE 4

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, when the prefixVal is not less than cMax>>cRiceParam, the prefix bin string may be a bit string of length cMax>>cRiceParam and all bins of which are 1.

Also, when cMax is greater than symbolVal, and cRiceParam is greater than 0, a suffix bin string of a TR bin string may be present. For example, the suffix bin string may be derived as described later.

The suffix value of the symbolVal for the syntax element may be derived by the following equation.

$$\text{suffixVal} = \text{symbolVal} - ((\text{prefixVal}) << \text{cRiceParam}) \quad \text{[Equation 7]}$$

Here, suffixVal may represent the suffix value of the symbolVal.

The suffix (namely, the suffix bin string) of a TR bin string may be derived based on the FL binarization process for the suffixVal where the cMax value is $(1<<\text{cRiceParam})-1$.

Meanwhile, if the value of the input parameter cRiceParam is 0, the TR binarization may be precisely truncated unary binarization, and a cMax value equal to the maximum possible value of a syntax element which is always decoded may be used.

Also, for example, the EGk binarization process may be performed as follows. A syntax element coded by ue(v) may be an Exp-Golumb coded syntax element.

In one example, the 0-th order Exp-Golomb (EG0) binarization process may be performed as follows.

A parsing process for the syntax element may be started by reading bits starting from a bitstream's current position, including the first non-zero bit, and counting the number of leading bits such as 0. The following table describes the process above.

TABLE 5

```
leadingZeroBits = −1
for( b = 0; !b; leadingZeroBits++ )
    b = read_bits( 1 )
```

Also, the variable codeNum may be derived by the following equation.

$$\text{codeNum} = 2^{\text{leadingZeroBits}} - 1 + \text{read\_bits}(\text{leadingZeroBits}) \quad \text{[Equation 8]}$$

Here, the value returned by read_bits(leadingZeroBits), namely, the value represented by read_bits(leadingZeroBits), may be interpreted as a binary representation of an unsigned integer for the most significant bit recorded first.

The table below shows a structure of the Exp-Golomb code in which a bit string is divided into "prefix" bits and "suffix" bits.

TABLE 6

| Bit string form | Range of codeNum |
|---|---|
| 1 | 0 |
| 0 1 $x_0$ | 1..2 |
| 0 0 1 $x_1$ $x_0$ | 3..6 |
| 0 0 0 1 $x_2$ $x_1$ $x_0$ | 7..14 |
| 0 0 0 0 1 $x_3$ $x_2$ $x_1$ $x_0$ | 15..30 |
| 0 0 0 0 0 1 $x_4$ $x_3$ $x_2$ $x_1$ $x_0$ | 31..62 |
| ... | ... |

The "prefix" bit may be a bit parsed as described above to calculate leadingZeroBits and may be represented by 0 or 1 of the bit string in Table 6. In other words, the bit string started with 0 or 1 in Table 6 above may represent a prefix bit string. The "suffix" bit may be a bit parsed from the calculation of codeNum and may be denoted by $x_i$ in Table 6 above. In other words, a bit string started with $x_i$ in Table 6 above may represent a suffix bit string. Here, i may be a value ranging from 0 to LeadingZeroBits-1. Also, each $x_i$ may correspond to 0 or 1.

The table below shows bit strings assigned to the code-Num.

TABLE 7

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

When the descriptor of a syntax element is ue(v), that is, when the syntax element is coded by ue(v), the value of the syntax element may be the same as codeNum.

Also, for example, the EGk binarization process may be performed as follows.

An input to the EGk binarization process may be a request for EGk binarization. Also, an output of the EGk binarization process may be EGk binarization for the simbolVal corresponding to a bin string.

A bit string of the EGk binarization process for symbolVal may be derived as follows.

TABLE 8

```
absV = Abs( symbolVal )
stopLoop = 0
do
    if( absV >= ( 1 << k ) ) {
        put( 1 )
        absV = absV − ( 1 << k )
        k++
    } else {
        put( 0 )
        while( k-- )
            put( ( absV >> k ) & 1 )
        stopLoop = 1
    }
while( !stopLoop )
```

Referring to Table 8 above, a binary value X may be added to the end of a bin string through each call of put(X). Here, X may be 0 or 1.

Also, for example, the FL binarization process may be performed as follows.

An input to the FL binarization process may be a request for FL binarization and cMax for the syntax element. Also, an output of the FL binarization process may be FL binarization for symbolVal corresponding to a bin string.

FL binarization may be carried out using a bit string having bits corresponding to a fixed length of the symbol value symbolVal. Here, the fixed length bit may be an unsigned integer bit string. That is, a bit string for the symbol value symbolVal may be derived through FL binarization, and the bit length (namely, the number of bits) of the bit string may be a fixed length.

For example, the fixed length may be derived by the following equation.

$$\text{fixedLength} = \text{Ceil}(\text{Log } 2(\text{cMax}+1)) \qquad \text{[Equation 9]}$$

Indexing of bins for FL binarization may use a value increasing in the order from the most significant bit to the least significant bit. For example, a bin index related to the most significant bit may be binIdx=0.

Meanwhile, a binarization process for the syntax element abs_remainder among the residual information may be performed as follows.

An input to the binarization process for the abs_remainder and the dec_abs_level is a request for binarization of the syntax element abs_remainder[n] or the syntax element dec_abs_level[n], color component cIdx, luma position (x0, y0), current coefficient scan position (xC, yC), log 2TbWidth, which is the binary logarithm of the width of the transform block, and log 2TbHeight, which is the binary logarithm of the height of the transform block. The luma location (x0, y0) may indicate a top-left sample of the current luma transform block based on the top-left luma sample of a picture.

An output of the binarization process for the abs_remainder (or the dec_abs_level) may be binarization of the abs_remainder (or the dec_abs_level) (namely, a binarized bin string of the abs_remainder (or the dec_abs_level)). Available bin strings for the abs_remainder (or the dec_abs_level) may be derived through the binarization process.

The Rice parameter cRiceParam for the abs_remainder (or the dec_abs_level) may be derived through a Rice parameter derivation process performed using the color component cIdx, the luma position (x0, y0), the current coefficient scan position (xC, yC), and log 2TbHeight, which is the binary logarithm of the height of the transform block, as inputs. A detailed description of the Rice parameter derivation process will be described later.

Also, for example, cMax for the abs_remainder (or the dec_abs_level) may be derived based on the Rice parameter cRiceParam. The cMax may be derived by the following equation.

$$\text{cMax} = (\text{cRiceParam} == 1\:?\:6\:\::\:7) << \text{cRiceParam} \qquad \text{[Equation 10]}$$

Referring to Eq. 10 above, if the value of cRiceParam is 1, the cMax may be derived as 6<<cRiceParam, and if the value of cRiceParam is not 1, the cMax may be derived as 7<<cRiceParam.

On the other hand, in the presence of a suffix bin string, binarization for the abs_remainder (or the dec_abs_level), namely, a bin string for the abs_remainder (or the dec_abs_level), may be a concatenation of a prefix bin string and a suffix bin string. Also, in the absence of the suffix bin string, the bin string for the abs_remainder (or the dec_abs_level) may be the prefix bin string.

For example, the prefix bin string may be derived as described later.

The prefix value prefixVal of the abs_remainder may be derived by the following equation.

$$\text{prefixVal} = \text{Min}(\text{cMax}, \text{abs\_remainder}[n]) \qquad \text{[Equation 11]}$$

The prefix of the bin string of the abs_remainder (namely, the prefix bin string) may be derived through the TR binarization process for the prefixVal using the cMax and the cRiceParam as inputs.

If the prefix bin string is the same as a bit string, all bits of which are 1 and the bit length of which is 4, a suffix bin string of the bin string of the abs_remainder may be present and may be derived as described below.

The suffix value suffixVal of the abs_remainder may be derived by the following equation.

$$\text{suffixVal} = \text{abs\_remainder}[n] \text{cMax} \qquad \text{[Equation 12]}$$

The suffix bin string of the bin string of the abs_remainder may be derived through the EGk binarization process for the suffixVal in which k is set to cRiceParam+1.

Meanwhile, the Rice parameter derivation process described above may be as follows.

An input to the Rice parameter derivation process is a color component index cIdx, a luma position (x0, y0), a current coefficient scan position (xC, yC), log 2TbWidth, which is binary logarithm of the width of the transform block, and log 2TbHeight, which is binary logarithm of the height of the transform block. The luma location (x0, y0) may indicate a top-left sample of the current luma transform block based on the top-left luma sample of a picture. Also, an output of the Rice parameter derivation process may be the Rice parameter cRiceParam.

For example, the variable locSumAbs may be derived based on the given syntax elements sig_coeff_flag[x][y], the component index cIdx, and an array AbsLevel[x][C] for the transform block at the top-left luma position (x0, y0) according to the pseudo-code shown in the following table.

TABLE 9

```
locSumAbs = 0
if( xC < (1 << log2TbWidth) - 1 ) {
    locSumAbs += AbsLevel[ xC + 1 ][ yC ] - sig_coeff_flag[ xC + 1 ][ yC ]
    if( xC < (1 << log2TbWidth) - 2 )
        locSumAbs += AbsLevel[ xC + 2 ][ yC ] - sig_coeff_flag[ xC + 2 ][ yC ]
    if( yC < (1 << log2TbHeight) - 1 )
        locSumAbs += AbsLevel[ xC + 1 ][ yC + 1 ] - sig_coeff_flag[ xC + 1 ][ yC + 1 ]
```

TABLE 9-continued

```
}
if( yC < (1 << log2TbHeight) - 1 ) {
    locSumAbs += AbsLevel[ xC ][ yC + 1 ] - sig_coeff_flag[ xC ][ yC + 1 ]
    if( yC < (1 << log2TbHeight) - 2 )
        locSumAbsPass1 += AbsLevelPass1 [ xC ][ yC + 2 ] - sig_coeff_flag[ xC ][ yC + 2 ]
}
```

The Rice parameter cRiceParam may be derived as follows.

For example, when the locSumAbs is less than 12, the cRiceParam may be set to 0. Alternatively, when the above condition is not met, and the locSumAbs is less than 25 (namely, when the locSumAbs is greater than or equal to 12 and less than 25), the cRiceParam may be set to 1. Or, when the above condition is not met (namely, when the locSumAbs is greater than or equal to 25), the cRiceParam may be set to 2.

Meanwhile, as described in Table 1, according to the VVC standards, whether to transform a corresponding block may be delivered before encoding/decoding a residual signal (namely, residual information). In other words, a transform skip flag (namely, transform_skip_flag) indicating whether to apply transformation before parsing of a current blocks residual information may be parsed first. The transform skip flag may also be referred to as a transform flag or a transform application flag.

By expressing a correlation between residual signals in the transform domain, data compaction is performed, and the compacted data is delivered to the decoding apparatus; however, when the correlation between residual signals is insufficient, data compaction may not be performed to a sufficient level. In this case, a transform process involving complicated calculations may be omitted, and a residual signal in the pixel domain may be delivered to the decoding apparatus. A residual signal in the pixel domain which has not been transformed has different characteristics from the residual signal of the general transform domain (for example, distribution of residual signals and the absolute level of each residual signal); therefore, a residual signal encoding/decoding method for efficiently delivering the residual signal to the decoding apparatus is proposed.

Figure 6:
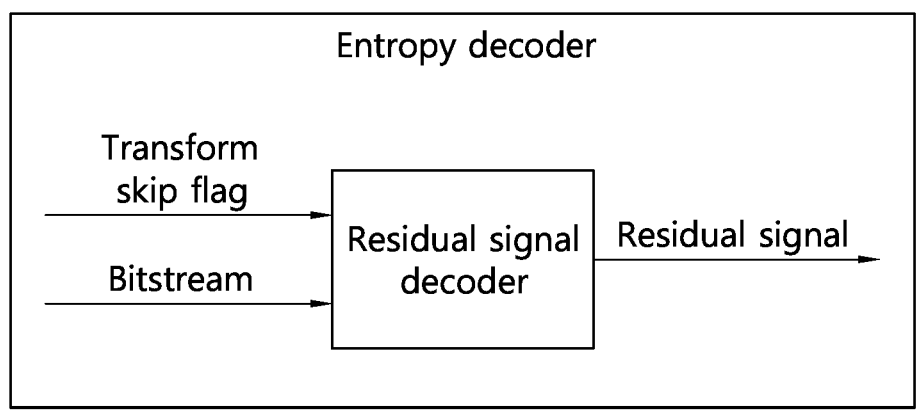
FIG. 6 illustrates a decoding apparatus performing a method for delivering a residual signal of the pixel domain according to the present disclosure.

FIG. 6 illustrates a decoding apparatus performing a method for delivering a residual signal of the pixel domain according to the present disclosure.

A transform skip flag may be transmitted in transform block units. Here, referring to Table 1, the transform skip flag may be parsed so that it is limited to a specific block size. In other words, referring to Table 1, the transform skip flag may be parsed only for a transform block of which the size is less than a specific size. For example, when the current transform block size is 4×4 or less, the transform skip flag for the current transform block may be parsed.

In this regard, as an example, the present disclosure proposes an embodiment in which the block size for determining whether to parse the transform skip flag is configured in various ways. Specifically, the sizes of Log 2TbWidth and log 2TbHeight may be determined by variables wN and hN, and according to an existing method, the wN and hN may be selected from one of the following.

wN={2, 3, 4, 5, 6}
hN={2, 3, 4, 5, 6}

In other words, the wN may be selected as one from among 2, 3, 4, 5, and 6, and the hN may be selected as one from among 2, 3, 4, 5, and 6.

A method for parsing a transform skip flag according to the present embodiment may be described as shown in the table below.

TABLE 10

| if( transform_skip_enabled_flag &&<br>( cIdx != 0 \|\| cu_mts_flag[ x0 ][ y0 ] = = 0 ) &&<br>( log2TbWidth <= wN ) && ( log2TbHeight <= hN ) )<br>    transform_skip_flag[ x0 ][ y0 ][ cIdx ] | ae(v) |
|---|---|

According to the present embodiment disclosed in Table 10, when log 2TbWidth, which represents the width of a current block (namely, the current transform block), is less than wN, and log 2TbHeight, which represents the height of the current block, is less than hN, a transform skip flag for the current block may be parsed. A method for decoding a residual signal of the current block may be determined based on the transform skip flag. By efficiently processing signals having different statistical characteristics according to the proposed embodiment, it is possible to reduce complexity in the entropy decoding process and to enhance encoding efficiency.

Also, referring to Table 1 above, it is assumed that the transform skip flag is parsed only for a case of specific block size; however, an embodiment may be proposed, in which a condition for determining whether to parse the transform skip flag is defined by the number of samples of a block rather than the width and height information of the corresponding block. In other words, for example, a method for using the product of log 2TbWidth and log 2TbHeight as a condition for determining whether to parse the syntax element transform_skip_flag of the transform skip flag may be proposed.

The log 2TbWidth and the log 2TbHeight may be selected as one from among the following.

log 2TbWidth={1, 2, 3, 4, 5, 6}
log 2TbHeight={1, 2, 3, 4, 5, 6}

In other words, the log 2TbWidth may be selected as one from among 1, 2, 3, 4, 5, and 6, and the log 2TbHeight may be selected as one from among 1, 2, 3, 4, 5, and 6.

Figure 7A:
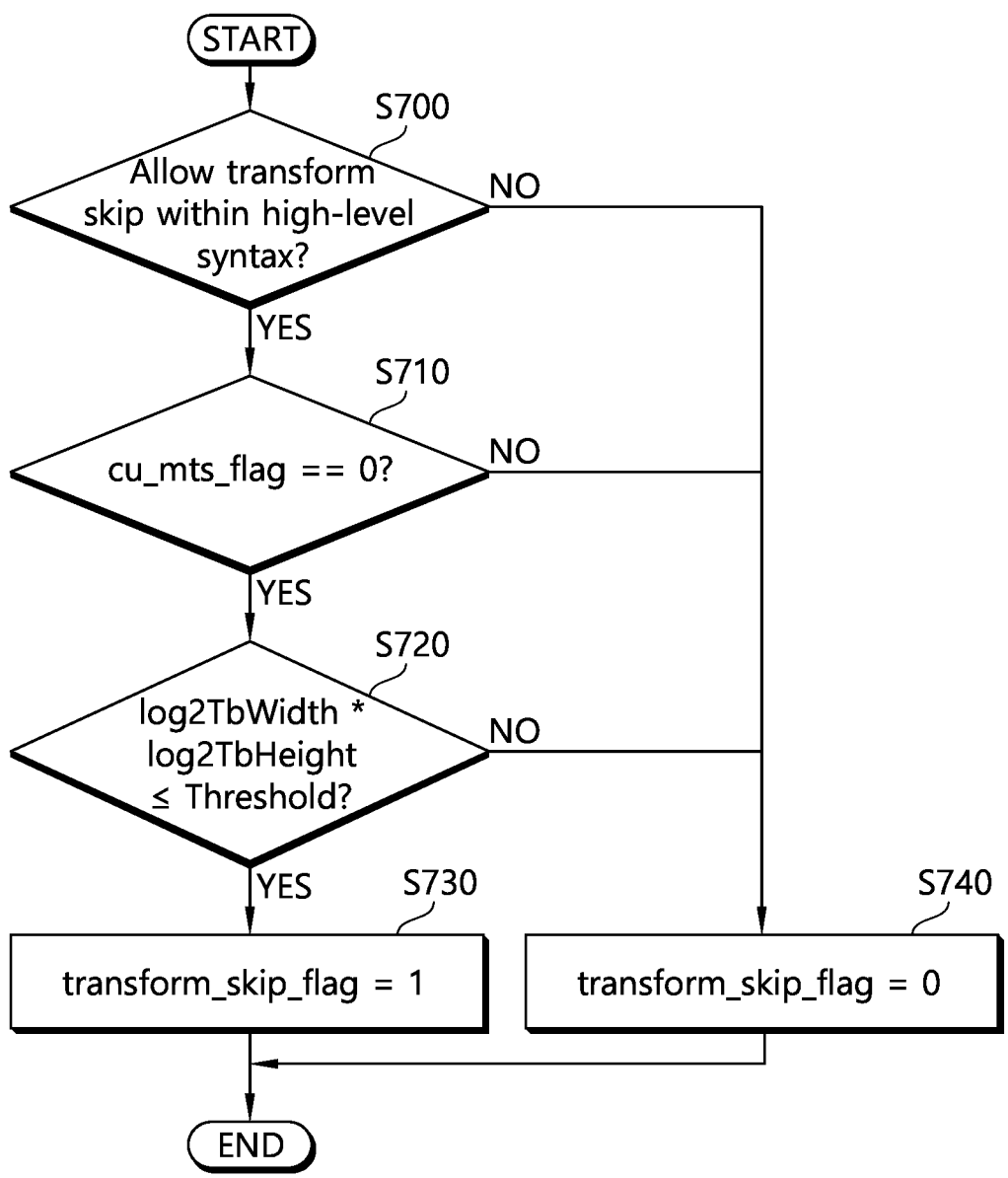
FIGS. 7a and 7b illustrate an embodiment for determining whether to parse a transform skip flag based on the number of samples of a current block and a decoding apparatus performing the embodiment.
Figure 7B:
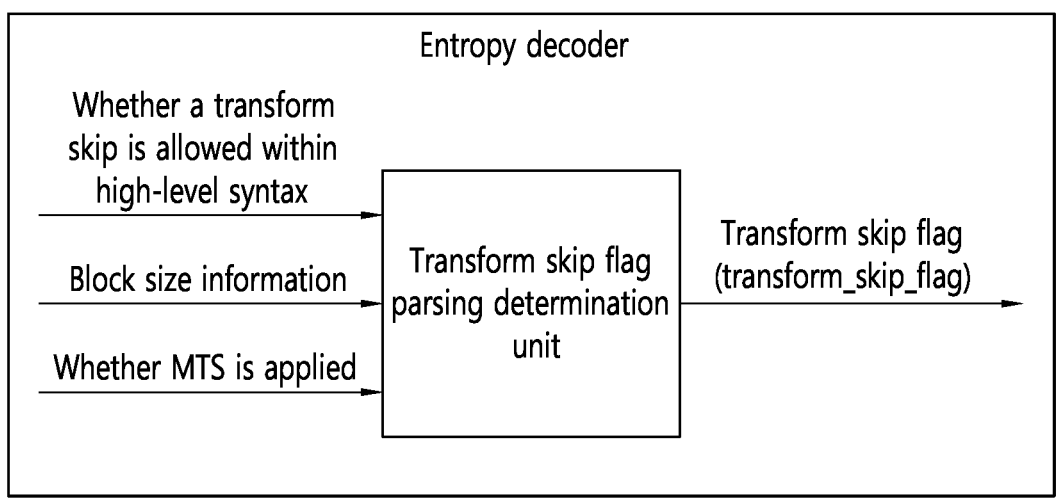

FIGS. 7a and 7b illustrate an embodiment for determining whether to parse a transform skip flag based on the number of samples of a current block and a decoding apparatus performing the embodiment.

Referring to FIG. 7a, the decoding apparatus may determine whether determination of transform skip of a current block is allowed for high-level syntax S700. If the determination of whether transform skip of the current block is allowed for the high-level syntax, the decoding apparatus may determine whether a value of a syntax element cu_mts_flag is 0 S710.

If the value of cu_mts_flag is 0, the decoding apparatus may determine whether the product of log 2TbWidth and log 2TbHeight for the current block is less than or equal to a threshold S720. In other words, the decoding apparatus may determine whether the number of samples of the current block is less than or equal to the threshold.

If the product of the log 2TbWidth and the log 2TbHeight is less than or equal to the threshold, the decoding apparatus may parse the value of the syntax element transform_skip_flag of the transform skip flag to 1 S730.

On the other hand, when the conditions of the S700 to S720 are not met, the decoding apparatus may derive the value of the syntax element tansform_skip_flag of the transform skip flag as 0 S740.

FIG. 7b illustrates a decoding apparatus performing an embodiment for determining whether to transform the block based on the number of samples within a block. Referring to FIG. 7b, the decoding apparatus may determine whether to parse the transform skip flag for the block based on whether transform skip is allowed within high-level syntax, block size information, and whether to apply MTS.

When the number of samples within a block determines whether to transform the block, various shapes of blocks may be included in a transform exclusion block compared to the cases where the blocks width and height control whether to apply the transform. For example, when both the log 2TbWidth and the log 2TbHeight are set to 2 in an embodiment where the blocks width and height control whether to apply the transform, only 2×4, 4×2, and 4×4 blocks are included in the transform exclusion block while, when the number of samples determines whether to apply the transform, 2×8 and 8×2 blocks may also be included in the transform exclusion block.

A method for decoding a residual signal of the current block may be determined based on the transform skip flag. Also, by efficiently processing signals having different statistical characteristics according to the proposed embodiment, it is possible to reduce complexity in the entropy decoding process and to enhance encoding efficiency.

For example, considering statistical characteristics observed when the transformation is not applied to a residual signal for the current block, the following embodiment for encoding/decoding a residual signal may be proposed.

In general, a transform block that undergoes transformation and quantization (namely, transformed and quantized transform coefficients) tends to have energy concentrated near the top-left corner of the transform block due to the transformation. Also, the closer to the bottom-right corner (high-frequency area), the energy level tends to decrease due to the quantization. Therefore, a diagonal scanning technique has been introduced for efficient residual encoding considering the characteristics, as shown in FIG. 5. However, in the case of a transform skip block, namely, a transform block including residual coefficients to which transformation is not applied, energy may be distributed evenly over the whole block without being concentrated at the top-left corner, and the energy level may exhibit a random characteristic. Therefore, it may be inefficient to encode the block using the diagonal scanning technique. Accordingly, the present embodiment proposes a residual scanning scheme suitable for the characteristics of a transform skip block. Here, the residual coefficients may mean the transform coefficients.

In addition, as another feature of the transform skip block, when the prediction mode applied to a transform skip block to be currently encoded is an intra prediction mode, the size of a residual sample becomes more prominent as it approaches the blocks bottom-right corner where a prediction sample is distant from a reference sample. Considering this property, the present embodiment proposes a method for rearranging and encoding a residual signal to be scanned from the top-left corner of the transform block and enabling the decoding apparatus to parse the residual signal and rearrange the parsed residual signal back to its original position. In other words, the present embodiment proposes a method for rearranging and encoding a residual signal to scan a residual signal with a large magnitude from the top-left corner of a transform block and enabling the decoding apparatus to parse the residual signal and rearrange the parsed residual signal to its original position. A method using a new scanning scheme for encoding and decoding a residual signal may be considered to obtain a similar effect. However, when residuals are rearranged according to the method of the present embodiment, an advantageous effect is obtained that existing residual encoding modules may still be used without modification.

When rearranging residuals while maintaining existing residual encoding modules, a point to consider is that a scanning order has to be defined from the upper-left area to the lower-right area.

As one example of a rearrangement method, a method for rotating a current block by 180 degrees may be defined.

Figure 8:
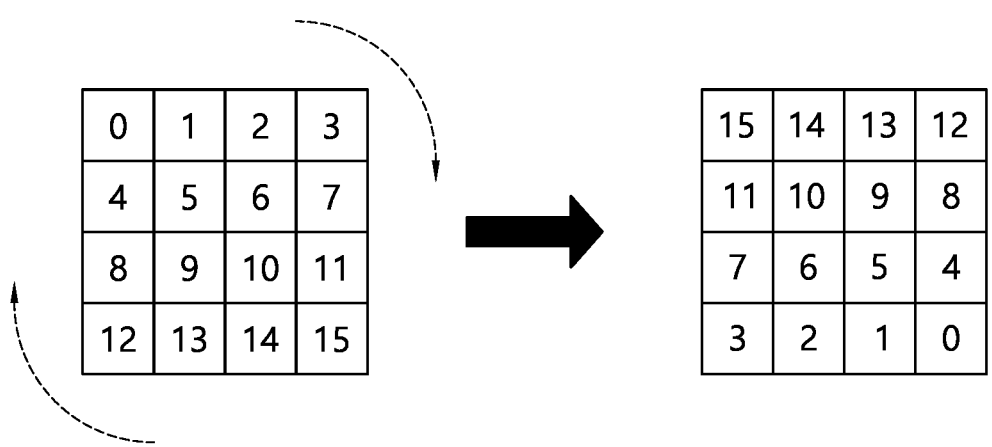
FIG. 8 illustrates residual coefficients of a current block to which a rearrangement method by a rotation of 180 degrees is applied.

FIG. 8 illustrates residual coefficients of a current block to which a rearrangement method by a rotation of 180 degrees is applied.

The numbers in a current block shown in FIG. 8 represent the pixel position within the block in the raster scan order. Referring to FIG. 8, a residual coefficient at the top-left corner may be rearranged to the bottom-right corner of the block by a rotation of 180 degrees. Referring to FIG. 8, through the rearrangement by a rotation of 180 degrees, residual coefficients may be rearranged to the positions symmetrical with respect to the center of the transform block. After rearrangement, a regular residual coefficient scan order is applied, where a residual coefficient positioned at the bottom-right corner due to the rearrangement is scanned first, and then a residual coefficient positioned at the top-left corner due to the rearrangement is scanned.

As another example of the rearrangement method, a method for mirroring a current block may be defined. Meanwhile, depending on a mirroring direction, the method may be further divided into anti-diagonal mirroring and main diagonal mirroring methods.

FIG. 9 illustrates residual coefficients of a current block to which a mirroring rearrangement method is applied. FIG. 9(a) illustrates one example in which residual coefficients of a current block are rearranged through anti-diagonal mirroring, and FIG. 9(b) illustrates one example in which residual coefficients of the current block are rearranged through main diagonal mirroring.

Referring to FIG. 9(a), through the rearrangement process using anti-diagonal mirroring, residual coefficients may be rearranged to the positions symmetrical with respect to the upward-right diagonal line of the current block. Here, the upward-right diagonal line may represent a diagonal line in an upward-right direction passing through the center of the current block. For example, a residual coefficient at the top-left corner may be rearranged to the bottom-right corner through anti-diagonal mirroring. Also, for example, the first residual coefficient (namely, the residual coefficient adjacent to the right of the residual coefficient at the top-left position) may be rearranged to a position adjacent to the upper side of the bottom-right corner that is the anti-diagonal mirroring position. In other words, when the width and height of the current block are 4, and the x component and the y component at the top-left sample position of the current block are 0, the residual coefficient at the position (1, 0) may be rearranged to the position (3, 3), which is obtained by anti-diagonal mirroring.

Meanwhile, referring to FIG. 9(b), through the rearrangement process using main-diagonal mirroring, residual coefficients may be rearranged to the positions symmetrical with respect to the upward-left diagonal line of the current block. Here, the upward-left diagonal line may represent a diagonal line in an upward-left direction passing through the center of the current block. For example, a residual coefficient at the top-right corner may be rearranged to the bottom-left corner through main-diagonal mirroring. Also, for example, the first residual coefficient (namely, the residual coefficient adjacent to the right of the residual coefficient at the top-left position) may be rearranged to a position adjacent to the lower side of the top-left corner that is the main-diagonal mirroring position. In other words, when the width and height of the current block are 4, and the x component and the y component at the top-left sample position of the current block are 0, the residual coefficient at the position (1, 0) may be rearranged to the position (1, 0), which is obtained by main-diagonal mirroring.

Alternatively, as yet another example of the rearrangement method, a method for flipping a current block may be defined. Meanwhile, depending on a flipping axis, the method may be further divided into vertical flip and horizontal flip methods.

FIG. 10 illustrates residual coefficients of a current block to which a flip rearrangement method is applied. FIG. 10(a) illustrates one example in which residual coefficients of a current block are rearranged through a vertical flip, and FIG. 10(b) illustrates one example in which residual coefficients of the current block are rearranged through a horizontal flip.

Referring to FIG. 10(a), through the rearrangement process using a vertical flip, residual coefficients may be rearranged to the positions symmetrical with respect to the vertical axis of the current block. Here, the vertical axis may represent a vertical line passing through the center of the current block. For example, a residual coefficient at the top-left corner may be rearranged to the top-right corner through a vertical flip. Also, for example, the first residual coefficient (namely, the residual coefficient adjacent to the right of the residual coefficient at the top-left position) may be rearranged to a position adjacent to the left side of the top-right corner that is a vertically flipped position. In other words, when the width and height of the current block are 4, and the x component and the y component at the top-left sample position of the current block are 0, the residual coefficient at the position (1, 0) may be rearranged to the position (2, 0), which is obtained by a vertical flip.

Alternatively, referring to FIG. 10(b), through the rearrangement process using a horizontal flip, residual coefficients may be rearranged to the positions symmetrical with respect to the horizontal axis of the current block. Here, the horizontal axis may represent a horizontal line passing through the center of the current block. For example, a residual coefficient at the top-right corner may be rearranged to the bottom-right corner through a horizontal flip. Also, for example, the first residual coefficient (namely, the residual coefficient adjacent to the right of the residual coefficient at the top-left position) may be rearranged to a position adjacent to the right side of the bottom-left corner that is a horizontally flipped position. In other words, when the width and height of the current block are 4, and the x component and the y component at the top-left sample position of the current block are 0, the residual coefficient at the position (1, 0) may be rearranged to the position (1, 3), which is obtained by a horizontal flip.

Alternatively, as still another example of the rearrangement method, residual coefficients of a current block may be rearranged according to a distance from a reference sample of intra prediction. For example, layers may be defined within a TU according to a distance between a reference sample and a prediction block, and after determining whether to perform a horizontal-first scan or a vertical-first scan on the residual coefficients of each layer, the encoding apparatus may rearrange the residual coefficients in the inverse raster order (which progresses in the direction from right to left and bottom to top) according to the scanned order. In other words, layers of the current block may be defined based on a distance from the reference sample, and the encoding/decoding apparatus may determine the order of scanning residual coefficients of each layer as a horizontal-first scan or a vertical-first scan and rearrange the residual coefficients in the inverse raster order according to the scanned order (in the direction from right to left and bottom to top). Meanwhile, the decoding apparatus may derive existing residual coefficients by performing the rearrangement process in reverse order.

FIG. 11 illustrates residual coefficients of a current block to which the embodiment is applied, which derives a layer divided based on a distance from a reference sample and rearranges the residual coefficients at positions in inverse raster order. FIG. 11(a) illustrates one example in which residual coefficients of each layer are rearranged to the positions in inverse raster order according to the horizontal-first scanned order, and FIG. 11(b) illustrates one example in which residual coefficients of each layer are rearranged to the positions in inverse raster order according to the vertical-first scanned order.

Referring to FIG. 11, layers of the current block may include a first layer adjacent to at least one reference sample, a second layer having a distance of 1 from the closest reference sample, a third layer having a distance of 2 from the closest reference sample, and a fourth layer having a distance of 3 from the closest reference sample. In other words, the first layer may include residual coefficients adjacent to at least one reference sample (for example, 0th to 4th residual coefficients, 8th residual coefficient, and 12th residual coefficient of the current block of FIG. 11 before the residual coefficients are rearranged) (in other words, the first layer may include residual coefficients having a distance of 1 from the closest reference sample); the second layer may include residual coefficients having a distance of 2 from the closest reference sample (for example, 5th to 7th residual coefficients, 9th residual coefficient, and 13th residual coefficient of the current block of FIG. 11 before the residual coefficients are rearranged); the third layer may include residual coefficients having a distance of 3 from the closest reference sample (for example, 10th to 11th residual coefficients and 14th residual coefficient of the current block of FIG. 11 before the residual coefficients are rearranged); and the fourth layer may include residual coefficients having a distance of 4 from the closest reference sample (for example, 15th residual coefficient of the current block of FIG. 11 before the residual coefficient is rearranged).

When the layers for the current block are defined as described above, the encoding apparatus may determine a horizontal-first scan or a vertical-first scan as a method for scanning layers of the current block.

For example, when the horizontal-first scan is determined as a method for scanning layers of the current block, rearrangement of the residual coefficients may be performed as illustrated in FIG. 11(a).

Specifically, the encoding apparatus may scan the current block in the order from the first layer to the fourth layer, where scanning may be performed horizontally from the residual coefficient at the top-left position in the corresponding layer. After the residual coefficients are all scanned in the horizontal direction, the remaining residual coefficients in the vertical direction may be scanned from top to bottom.

As one example, the first layer's horizontal residual coefficients may include 0th to 3rd residual coefficients, and the first layer's vertical residual coefficients may include 4th residual coefficient, 8th residual coefficient, and 12th residual coefficient. The encoding/decoding apparatus may scan the horizontal residual coefficients in the first layer from left to right (scan in the order of 0th, 1st, 2nd, and 3rd residual coefficient) and then scan the vertical residual coefficients in the first layer in the order from top to bottom (scan in the order of 4th, 8th, and 12th residual coefficient). Next, the second layer may be scanned. The second layer's horizontal residual coefficients may include 5th to 7th residual coefficients, and the second layer's vertical residual coefficients may include 9th residual coefficient and 13th residual coefficient. The encoding apparatus may scan the horizontal residual coefficients in the second layer from left to right (scan in the order of 5th, 6th, and 7th residual coefficient) and then scan the vertical residual coefficients in the second layer in the order from top to bottom (scan in the order of 9th and 13th residual coefficient). Next, the third layer may be scanned. The third layer's horizontal residual coefficients may include 10th to 11th residual coefficients, and the third layer's vertical residual coefficients may include the 14th residual coefficient. The encoding apparatus may scan the horizontal residual coefficients in the third layer from left to right (scan in the order of 10th and 11th residual coefficient) and then scan the vertical residual coefficients in the third layer in the order from top to bottom (scan in the order of 14th residual coefficient). Next, the fourth layer may be scanned. The fourth layer's horizontal residual coefficients may include 15th residual coefficient. The encoding apparatus may scan the horizontal residual coefficients in the fourth layer from left to right (scan 15th residual coefficient).

Afterward, referring to FIG. 11(a), the encoding apparatus may rearrange the residual coefficients in inverse raster order according to the scanned order (from right to left and bottom to top). The scanned order of the residual coefficients may be in the order of 0th, 1st, 2nd, 3rd, 4th, 8th, 12th, 5th, 6th, 7th, 9th, 13th, 10th, 11th, 14th, and 15th residual coefficient as described above. The residual coefficients may be rearranged in inverse raster order according to the scanned order within the current block. For example, the 0th residual coefficient may be rearranged to the bottom-right corner; 1st, 2nd, and 3rd residual coefficients may be rearranged to the left of the bottom-right corner; 4th, 8th, 12th, and 5th residual coefficients from right to left in the upper row of the bottom-right corner; 6th, 7th, 9th, and 13th residual coefficients from right to left in the second row of the current block; and 10th, 11th, 14th, and 15th residual coefficients from right to left in the first row of the current block.

Also, for example, when the vertical-first scan is determined as a method for scanning layers of the current block, the residual coefficients may be rearranged as shown in FIG. 11(b).

Specifically, the encoding apparatus may scan the current block in the order from the first layer to the fourth layer, where scanning may be performed vertically from the residual coefficient at the top-left position in the corresponding layer. After the residual coefficients are all scanned in the vertical direction, the remaining residual coefficients in the horizontal direction may be scanned from top to bottom.

As one example, the first layer's vertical residual coefficients may include 0th, 4th, 8th, and 12th residual coefficients, and the first layer's horizontal residual coefficients may include 1st to 3rd residual coefficients. The encoding apparatus may scan the vertical residual coefficients in the first layer from top to bottom (scan in the order of 0th, 4th, 8th, and 12th residual coefficient) and then scan the horizontal residual coefficients in the first layer in the order from left to right (scan in the order of 1st, 2nd, and 3rd residual coefficient). Next, the second layer may be scanned. The second layer's vertical residual coefficients may include 5th, 9th, and 13th residual coefficients, and the second layer's horizontal residual coefficients may include 6th to 7th residual coefficients. The encoding apparatus may scan the vertical residual coefficients in the second layer from top to bottom (scan in the order of 5th, 9th, and 13th residual coefficient) and then scan the horizontal residual coefficients in the second layer in the order from left to right (scan in the order of 6th and 7th residual coefficient). Next, the third layer may be scanned. The third layer's vertical residual coefficients may include 10th to 14th residual coefficients, and the third layer's horizontal residual coefficients may include the 11th residual coefficient. The encoding apparatus may scan the vertical residual coefficients in the third layer from top to bottom (scan in the order of 10th and 14th residual coefficient) and then scan the horizontal residual coefficients in the third layer in the order from left to right (scan in the order of 11th residual coefficient). Next, the fourth layer may be scanned. The fourth layer's vertical residual coefficients may include 15th residual coefficient. The encoding apparatus may scan the vertical residual coefficients in the fourth layer from top to bottom (scan 15th residual coefficient).

Afterward, referring to FIG. 11(b), the encoding apparatus may rearrange the residual coefficients in inverse raster order according to the scanned order (from right to left and bottom to top). The scanned order of the residual coefficients may be in the order of 0th, 4th, 8th, 12th, 1st, 2nd, 3rd, 5th, 9th, 13th, 6th, 7th, 10th, 14th, 11th, and 15th residual coefficient as described above. The residual coefficients may be rearranged in inverse raster order according to the scanned order within the current block. For example, the 0th residual coefficient may be rearranged to the bottom-right corner; 4th, 8th, and 12th residual coefficients may be rearranged to the left of the bottom-right corner; 1st, 2nd, 3rd, and 5th residual coefficients from right to left in the upper row of the bottom-right corner; 9th, 13th, 6th, and 7th residual coefficients from right to left in the second row of the current block; and 10th, 14th, 11th, and 15th residual coefficients from right to left in the first row of the current block.

Alternatively, another embodiment may be proposed, in which residual coefficients of a current block are rearranged according to their distance from a reference sample of intra prediction. For example, layers may be defined within a TU according to a distance between a reference sample and a prediction block, and after determining whether to perform a horizontal-first scan or a vertical-first scan on the residual coefficients of each layer, the encoding apparatus may rearrange the residual coefficients in diagonal scan order according to their scanned order. In other words, layers of the current block may be defined based on a distance from the reference sample, and the encoding apparatus may determine the order of scanning residual coefficients of each layer as a horizontal-first scan or a vertical-first scan and rearrange the residual coefficients in diagonal scan order according to their scanned order. Meanwhile, the decoding apparatus may derive existing residual coefficients by performing the rearrangement process in reverse order.

FIG. 12 illustrates residual coefficients of a current block to which the embodiment is applied, which derives a layer divided based on a distance from a reference sample and rearranges the residual coefficients at positions in diagonal scan order. FIG. 12(a) illustrates one example in which residual coefficients of each layer are rearranged to the positions in diagonal scan order according to the horizontal-first scanned order, and FIG. 12(b) illustrates one example in which residual coefficients of each layer are rearranged to the positions in diagonal scan order according to the vertical-first scanned order.

Referring to FIG. 12, layers of the current block may include a first layer adjacent to at least one reference sample, a second layer having a distance of 1 from the closest reference sample, a third layer having a distance of 2 from the closest reference sample, and a fourth layer having a distance of 3 from the closest reference sample. In other words, the first layer may include residual coefficients adjacent to at least one reference sample (for example, 0th to 4th residual coefficients, 8th residual coefficient, and 12th residual coefficient of the current block of FIG. 12 before the residual coefficients are rearranged) (in other words, the first layer may include residual coefficients having a distance of 1 from the closest reference sample); the second layer may include residual coefficients having a distance of 2 from the closest reference sample (for example, 5th to 7th residual coefficients, 9th residual coefficient, and 13th residual coefficient of the current block of FIG. 12 before the residual coefficients are rearranged); the third layer may include residual coefficients having a distance of 3 from the closest reference sample (for example, 10th to 11th residual coefficients and 14th residual coefficient of the current block of FIG. 12 before the residual coefficients are rearranged); and the fourth layer may include residual coefficients having a distance of 4 from the closest reference sample (for example, 15th residual coefficient of the current block of FIG. 12 before the residual coefficient is rearranged).

When the layers for the current block are defined as described above, the encoding apparatus may determine a horizontal-first scan or a vertical-first scan as a method for scanning layers of the current block.

For example, when the horizontal-first scan is determined as a method for scanning layers of the current block, rearrangement of the residual coefficients may be performed as illustrated in FIG. 12(a).

Specifically, the encoding apparatus may scan the current block in the order from the first layer to the fourth layer, where scanning may be performed horizontally from the residual coefficient at the top-left position in the corresponding layer. After the residual coefficients are all scanned in the horizontal direction, the remaining residual coefficients in the vertical direction may be scanned from top to bottom.

As one example, the first layer's horizontal residual coefficients may include 0th to 3rd residual coefficients, and the first layer's vertical residual coefficients may include 4th, 8th, and 12th residual coefficients. The encoding apparatus may scan the horizontal residual coefficients in the first layer from left to right (scan in the order of 0th, 1st, 2nd, and 3rd residual coefficient) and then scan the vertical residual coefficients in the first layer in the order from top to bottom (scan in the order of 4th, 8th, and 12th residual coefficient). Next, the second layer may be scanned. The second layer's horizontal residual coefficients may include 5th to 7th residual coefficients, and the second layer's vertical residual coefficients may include 9th and 13th residual coefficients. The encoding apparatus may scan the horizontal residual coefficients in the second layer from left to right (scan in the order of 5th, 6th, and 7th residual coefficient) and then scan the vertical residual coefficients in the second layer in the order from top to bottom (scan in the order of 9th and 13th residual coefficient). Next, the third layer may be scanned. The third layer's horizontal residual coefficients may include 10th to 11th residual coefficients, and the third layer's vertical residual coefficients may include the 14th residual coefficient. The encoding apparatus may scan the horizontal residual coefficients in the third layer from left to right (scan in the order of 10th and 11th residual coefficient) and then scan the vertical residual coefficients in the third layer in the order from top to bottom (scan in the order of 14th residual coefficient). Next, the fourth layer may be scanned. The fourth layer's horizontal residual coefficients may include 15th residual coefficient. The encoding apparatus may scan the horizontal residual coefficients in the fourth layer from left to right (scan 15th residual coefficient).

Afterward, referring to FIG. 12(a), the encoding apparatus may rearrange the residual coefficients in diagonal scan order according to the scanned order (from top-right to bottom-left and bottom-right to top-left). The scanned order of the residual coefficients may be in the order of 0th, 1st, 2nd, 3rd, 4th, 8th, 12th, 5th, 6th, 7th, 9th, 13th, 10th, 11th, 14th, and 15th residual coefficient as described above. The residual coefficients may be rearranged in diagonal scan order according to the scanned order within the current block. For example, the 0th residual coefficient may be rearranged to the bottom-right corner on a first upward-right diagonal line; 1st and 2nd residual coefficients may be rearranged along a second upward-right diagonal line of the current block (namely, an upward-right diagonal line in the upper-left of the first upward-right diagonal line) in order from upper-right side to upper-left side; 3rd, 4th, and 8th residual coefficients along a third upward-right diagonal line of the current block (namely, an upward-right diagonal line in the upper-left of the second upward-right diagonal line) in order from upper-right side to upper-left side; 12th, 5th, 6th, and 7th residual coefficients along a fourth upward-right diagonal line of the current block (namely, an upward-right diagonal line in the upper-left of the third upward-right diagonal line) in order from upper-right side to upper-left side; 9th, 13th, and 10th residual coefficients along a fifth upward-right diagonal line of the current block (namely, an upward-right diagonal line in the upper-left of the fourth upward-right diagonal line) in order from upper-right side to upper-left side; 11th and 14th residual coefficients along a sixth upward-right diagonal line of the current block (namely, an upward-right diagonal line in the upper-left of the fifth upward-right diagonal line) in order from upper-right side to upper-left side; and 15th residual coefficient at the top-left corner along a seventh upward-right diagonal line of the current block (namely, an upward-right diagonal line in the upper-left of the sixth upward-right diagonal line).

Also, for example, when the vertical-first scan is determined as a method for scanning layers of the current block, rearrangement of the residual coefficients may be performed as illustrated in FIG. 12(b).

Specifically, the encoding apparatus may scan the current block in the order from the first layer to the fourth layer, where scanning may be performed vertically from the residual coefficient at the top-left position in the corresponding layer. After the residual coefficients are all scanned in the vertical direction, the remaining residual coefficients in the horizontal direction may be scanned from top to bottom.

As one example, the first layer's vertical residual coefficients may include 0th, 4th, 8th, and 12th residual coefficients, and the first layer's horizontal residual coefficients may include 1st to 3rd residual coefficients. The encoding apparatus may scan the vertical residual coefficients in the first layer from top to bottom (scan in the order of 0th, 4th, 8th, and 12th residual coefficient) and then scan the horizontal residual coefficients in the first layer in the order from left to right (scan in the order of 1st, 2nd, and 3rd residual coefficient). Next, the second layer may be scanned. The second layer's vertical residual coefficients may include 5th, 9th, and 13th residual coefficients, and the second layer's horizontal residual coefficients may include 6th to 7th residual coefficients. The encoding apparatus may scan the vertical residual coefficients in the second layer from top to bottom (scan in the order of 5th, 9th, and 13th residual coefficient) and then scan the horizontal residual coefficients in the second layer in the order from left to right (scan in the order of 6th and 7th residual coefficient). Next, the third layer may be scanned. The third layer's vertical residual coefficients may include 10th to 14th residual coefficients, and the third layer's horizontal residual coefficients may include the 11th residual coefficient. The encoding apparatus may scan the vertical residual coefficients in the third layer from top to bottom (scan in the order of 10th and 14th residual coefficient) and then scan the horizontal residual coefficients in the third layer in the order from left to right (scan in the order of 11th residual coefficient). Next, the fourth layer may be scanned. The fourth layers vertical residual coefficients may include 15th residual coefficient. The encoding apparatus may scan the vertical residual coefficients in the fourth layer from top to bottom (scan 15th residual coefficient).

Afterward, referring to FIG. 12(b), the encoding apparatus may rearrange the residual coefficients in diagonal scan order according to the scanned order (from top-right to bottom-left and bottom-right to top-left). The scanned order of the residual coefficients may be in the order of 0th, 4th, 8th, 12th, 1st, 2nd, 3rd, 5th, 9th, 13th, 6th, 7th, 10th, 14th, 11th, and 15th residual coefficient as described above. The residual coefficients may be rearranged in diagonal scan order according to the scanned order within the current block. For example, the 0th residual coefficient may be rearranged to the bottom-right corner on a first upward-right diagonal line; 4th and 8th residual coefficients may be rearranged along a second upward-right diagonal line of the current block (namely, an upward-right diagonal line in the upper-left of the first upward-right diagonal line) in order from upper-right side to upper-left side; 12th, 1st, and 2nd residual coefficients along a third upward-right diagonal line of the current block (namely, an upward-right diagonal line in the upper-left of the second upward-right diagonal line) in order from upper-right side to upper-left side; 3rd, 5th, 9th, and 13th residual coefficients along a fourth upward-right diagonal line of the current block (namely, an upward-right diagonal line in the upper-left of the third upward-right diagonal line) in order from upper-right side to upper-left side; 6th, 7th, and 10th residual coefficients along a fifth upward-right diagonal line of the current block (namely, an upward-right diagonal line in the upper-left of the fourth upward-right diagonal line) in order from upper-right side to upper-left side; 14th and 11th residual coefficients along a sixth upward-right diagonal line of the current block (namely, an upward-right diagonal line in the upper-left of the fifth upward-right diagonal line) in order from upper-right side to upper-left side; and 15th residual coefficient at the top-left corner along a seventh upward-right diagonal line of the current block (namely, an upward-right diagonal line in the upper-left of the sixth upward-right diagonal line).

Also, another embodiment may be proposed, in which residual coefficients of a current block are rearranged according to their distance from a reference sample of intra prediction. For example, a rearrangement method may be proposed, which sets a reference sample (a left reference sample or a top reference sample), scans residual coefficients by defining layers of the current block based on a distance from the set reference sample, and rearranges the residual coefficients to the positions in diagonal scan order according to their scanned order. Here, the residual coefficients within a layer defined based on a distance from a left reference sample may be scanned with a vertical-first scan, and the residual coefficients within a layer defined based on a distance from a top reference sample may be scanned with a horizontal-first scan.

FIG. 13 illustrates residual coefficients of a current block to which the embodiment is applied, which derives a layer divided based on a distance from a specific reference sample and rearranges the residual coefficients at positions in diagonal scan order. FIG. 13(a) illustrates one example in which residual coefficients of each layer set based on a distance from a top reference sample are rearranged to the positions in diagonal scan order according to the horizontal-first scanned order, and FIG. 13(b) illustrates one example in which residual coefficients of each layer set based on a distance from a left reference sample are rearranged to the positions in diagonal scan order according to the vertical-first scanned order. Meanwhile, the decoding apparatus may derive existing residual coefficients by performing the rearrangement process in reverse order.

Referring to FIG. 13(a), layers of the current block may include a first layer adjacent to at least one top reference sample, a second layer having a distance of 1 from the closest top reference sample, a third layer having a distance of 2 from the closest top reference sample, and a fourth layer having a distance of 3 from the closest top reference sample. In other words, the first layer may include residual coefficients adjacent to at least one top reference sample (for example, 0th to 3th residual coefficients of the current block of FIG. 13(a) before the residual coefficients are rearranged) (in other words, the first layer may include residual coefficients having a distance of 1 from the closest top reference sample); the second layer may include residual coefficients having a distance of 2 from the closest top reference sample (for example, 4th to 7th residual coefficients of the current block of FIG. 13(a) before the residual coefficients are rearranged); the third layer may include residual coefficients having a distance of 3 from the closest top reference sample (for example, 8th to 11th residual coefficients of the current block of FIG. 13(a) before the residual coefficients are rearranged); and the fourth layer may include residual coefficients having a distance of 4 from the closest top reference sample (for example, 12th to 15th residual coefficients of the current block of FIG. 13(a) before the residual coefficient is rearranged). In other words, the first layer may be derived as the first row of the current block, the second layer as the second row of the current block, the third layer as the third row of the current block, and the fourth layer as the fourth row of the current block.

When the layers for the current block are defined as described above, the encoding apparatus may determine a horizontal-first scan as a method for scanning layers of the current block. Afterward, rearrangement of the residual coefficients may be performed as shown in FIG. 13(a).

Specifically, the encoding apparatus may scan the current block in the order from the first layer to the fourth layer, where scanning may be performed on the residual coefficients in the corresponding layer from left to right.

As one example, the encoding apparatus may scan the residual coefficients in the first layer from left to right (scan in the order of 0th, 1st, 2nd, and 3rd residual coefficient). Next, the second layer may be scanned. The encoding apparatus may scan the residual coefficients in the second layer from left to right (scan in the order of 4th, 5th, 6th, and 7th residual coefficient). Next, the third layer may be scanned. The encoding apparatus may scan the residual coefficients in the third layer from left to right (scan in the order of 8th, 9th, 10th, and 11th residual coefficient). Next, the fourth layer may be scanned. The encoding apparatus may scan the residual coefficients in the fourth layer from left to right (scan in the order of 12th, 13th, 14th, and 15th residual coefficient).

Afterward, referring to FIG. 13(a), the encoding apparatus may rearrange the residual coefficients in diagonal scan order according to the scanned order (from top-right to bottom-left and bottom-right to top-left). The scanned order of the residual coefficients may be in the order of 0th, 1st, 2nd, 3rd, 4th, 5th, 6th, 7th, 8th, 9th, 10th, 11th, 12th, 13th, 14th, and 15th residual coefficient as described above. The residual coefficients may be rearranged in diagonal scan order according to the scanned order within the current block. For example, the 0th residual coefficient may be rearranged to the bottom-right corner on a first upward-right diagonal line; 1st and 2nd residual coefficients may be rearranged along a second upward-right diagonal line of the current block (namely, an upward-right diagonal line in the upper-left of the first upward-right diagonal line) in order from upper-right side to upper-left side; 3rd, 4th, and 5th residual coefficients along a third upward-right diagonal line of the current block (namely, an upward-right diagonal line in the upper-left of the second upward-right diagonal line) in order from upper-right side to upper-left side; 6th, 7th, 8th, and 9th residual coefficients along a fourth upward-right diagonal line of the current block (namely, an upward-right diagonal line in the upper-left of the third upward-right diagonal line) in order from upper-right side to upper-left side; 10th, 11th, and 12th residual coefficients along a fifth upward-right diagonal line of the current block (namely, an upward-right diagonal line in the upper-left of the fourth upward-right diagonal line) in order from upper-right side to upper-left side; 13th and 14th residual coefficients along a sixth upward-right diagonal line of the current block (namely, an upward-right diagonal line in the upper-left of the fifth upward-right diagonal line) in order from upper-right side to upper-left side; and 15th residual coefficient at the top-left corner along a seventh upward-right diagonal line of the current block (namely, an upward-right diagonal line in the upper-left of the sixth upward-right diagonal line).

Also, referring to FIG. 13(b), layers of the current block may include a first layer adjacent to at least one left reference sample, a second layer having a distance of 1 from the closest left reference sample, a third layer having a distance of 2 from the closest left reference sample, and a fourth layer having a distance of 3 from the closest left top reference sample. In other words, the first layer may include residual coefficients adjacent to at least one left reference sample (for example, 0th, 4th, 8th, and 12th residual coefficients of the current block of FIG. 13(b) before the residual coefficients are rearranged) (in other words, the first layer may include residual coefficients having a distance of 1 from the closest left reference sample); the second layer may include residual coefficients having a distance of 2 from the closest left reference sample (for example, 1st, 5th, 9th, and 13th residual coefficients of the current block of FIG. 13(b) before the residual coefficients are rearranged); the third layer may include residual coefficients having a distance of 3 from the closest top reference sample (for example, 2nd, 6th, 10th, and 14th residual coefficients of the current block of FIG. 13(b) before the residual coefficients are rearranged); and the fourth layer may include residual coefficients having a distance of 4 from the closest left reference sample (for example, 3th, 7th, 11th, and 15th residual coefficients of the current block of FIG. 13(b) before the residual coefficient is rearranged). In other words, the first layer may be derived as the first column of the current block, the second layer as the second column of the current block, the third layer as the third column of the current block, and the fourth layer as the fourth column of the current block.

When the layers for the current block are defined as described above, the encoding apparatus may determine a vertical-first scan as a method for scanning layers of the current block. Afterward, rearrangement of the residual coefficients may be performed as shown in FIG. 13(b).

Specifically, the encoding apparatus may scan the current block in the order from the first layer to the fourth layer, where scanning may be performed on the residual coefficients in the corresponding layer from top to bottom.

As one example, the encoding apparatus may scan the residual coefficients in the first layer from top to bottom (scan in the order of 0th, 4th, 8th, and 12th residual coefficient). Next, the second layer may be scanned. The encoding apparatus may scan the residual coefficients in the second layer from top to bottom (scan in the order of 1st, 5th, 9th, and 13th residual coefficient). Next, the third layer may be scanned. The encoding apparatus may scan the residual coefficients in the third layer from top to bottom (scan in the order of 2nd, 6th, 10th, and 14th residual coefficient). Next, the fourth layer may be scanned. The encoding apparatus may scan the residual coefficients in the fourth layer from top to bottom (scan in the order of 3rd, 7th, 11th, and 15th residual coefficient).

Afterward, referring to FIG. 13(b), the encoding apparatus may rearrange the residual coefficients in diagonal scan order according to the scanned order (from top-right to bottom-left and bottom-right to top-left). The scanned order of the residual coefficients may be in the order of 0th, 4th, 8th, 12th, 1st, 5th, 9th, 13th, 2nd, 6th, 10th, 14th, 3rd, 7th, 11th, and 15th residual coefficient as described above. The residual coefficients may be rearranged in diagonal scan order according to the scanned order within the current block. For example, the 0th residual coefficient may be rearranged to the bottom-right corner on a first upward-right diagonal line; 4th and 8th residual coefficients may be rearranged along a second upward-right diagonal line of the current block (namely, an upward-right diagonal line in the upper-left of the first upward-right diagonal line) in order from upper-right side to upper-left side; 12th, 1st, and 5th residual coefficients along a third upward-right diagonal line of the current block (namely, an upward-right diagonal line in the upper-left of the second upward-right diagonal line) in order from upper-right side to upper-left side; 9th, 13th, 2nd, and 6th residual coefficients along a fourth upward-right diagonal line of the current block (namely, an upward-right diagonal line in the upper-left of the third upward-right diagonal line) in order from upper-right side to upper-left side; 10th, 14th, and 3rd residual coefficients along a fifth upward-right diagonal line of the current block (namely, an upward-right diagonal line in the upper-left of the fourth upward-right diagonal line) in order from upper-right side to upper-left side; 7th and 11th residual coefficients along a sixth upward-right diagonal line of the current block (namely, an upward-right diagonal line in the upper-left of the fifth upward-right diagonal line) in order from upper-right side to upper-left side; and 15th residual coefficient at the top-left corner along a seventh upward-right diagonal line of the current block (namely, an upward-right diagonal line in the upper-left of the sixth upward-right diagonal line).

Meanwhile, for example, the rearrangement methods described above may be performed when the transformation is not applied to the residual coefficients of the current block. In other words, whether to apply the rearrangement methods may be determined based on whether the residual coefficients are transformed. In other words, whether to apply the rearrangement may be determined based on the transform skip flag for the current block.

Figure 14A:
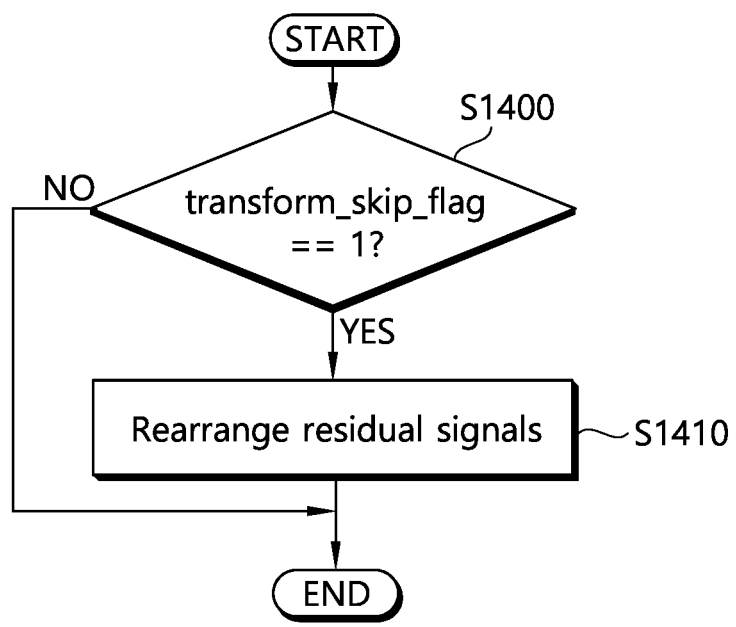

FIGS. 14a and 14b illustrate an embodiment for determining whether to apply the rearrangement method based on a transform skip flag for the current block and an encoding apparatus and a decoding apparatus performing the embodiment.

Referring to FIG. 14a, the encoding apparatus and the decoding apparatus may determine whether a value of the transform skip flag for a current block is 1 S1400. When the value of the transform skip flag is 1, the encoding apparatus and the decoding apparatus may perform the rearrangement method for the residual coefficients of the current block S1410. Meanwhile, when the value of the transform skip flag is not 1 (namely, when the value of the transform skip flag is 0), the encoding apparatus and the decoding apparatus may not perform the rearrangement method for the residual coefficients of the current block. The transform skip flag may indicate whether to transform the residual coefficients of the current block. In other words, the transform skip flag may indicate whether a transform has been applied to the residual coefficients. A syntax element indicating the transform skip flag may be the transform_skip_flag described above.

Also, FIG. 14b illustrates an encoding apparatus and a decoding apparatus that determine whether to apply the rearrangement method based on the transform skip flag for the current block and perform the rearrangement method. The residual rearrangement unit of the encoding apparatus may determine whether to rearrange the residual coefficients based on the transform skip flag for the current block and rearrange the residual coefficients when the value of the transform skip flag is 1; the quantizer and the entropy encoder of the encoding apparatus may generate residual information by quantizing and entropy encoding the rearranged residual coefficients and output the encoded residual information through a bitstream. Also, the entropy decoder of the decoding apparatus may receive a bitstream including the residual information of the current block, decode the residual information, and derive quantized residual coefficients. Afterward, the dequantizer of the decoding apparatus may inversely quantize (namely, scale) the quantized residual coefficients to derive residual coefficients. The residual rearrangement unit of the decoding apparatus may determine whether to rearrange the residual coefficients based on the transform skip flag for the current block and rearrange the residual coefficients when the value of the transform skip flag is 1.

In another example, methods for using the rearrangement methods in combination under various conditions may be proposed.

As one example, a rearrangement method or whether to rearrange a current block may be determined based on the size of the current block. Here, the size of the current block may indicate the number of samples of the current block or the width and the height of the current block. For example, when the number of samples of the current block is less than 64, the rearrangement method that rotates residual coefficients of the current block by 180 degrees may be applied; when the number of samples of the current block is greater than or equal to 64, the rearrangement method that uses mirroring of the residual coefficients of the current block may be applied. Alternatively, as another example, when the number of samples of the current block is less than 64, one of the rearrangement methods described above may be applied to the residual coefficients of the current block while, when the number of samples of the current block is greater than or equal to 64, the rearrangement method may not be applied. Meanwhile, for example, a process of determining a rearrangement method or whether to rearrange the current block based on the conditions described above may be performed only when the value of the transform skip flag of the current block is 1. In other words, when the value of the transform skip flag of the current block is 1, the rearrangement method or whether to rearrange the current block may be determined based on the size (the number of samples or the width and the height) of the current block.

Alternatively, as another example, a rearrangement method or whether to rearrange a current block may be determined based on the shape of the current block. For example, when the current block is a square block (namely, when the width and the height of the current block are the same), the rearrangement method that uses mirroring of the residual coefficients of the current block may be applied while, when the current block is a non-square block (namely, when the width and the height of the current block are different), the rearrangement method that rotates the residual coefficients of the current block by 180 degrees may be applied. Meanwhile, for example, the process of determining a rearrangement method or whether to rearrange the current block based on the conditions described above may be performed only when the value of the transform skip flag of the current block is 1. In other words, when the value of the transform skip flag of the current block is 1, the rearrangement method or whether to rearrange the current block may be determined based on the shape of the current block.

Alternatively, as yet another example, a rearrangement method or whether to rearrange a current block may be determined based on the ratio of the width to the height of the current block. For example, when the ratio of the width to the height of the current block is greater than or equal to 2 or less than or equal to ½ (namely, when a value obtained by dividing the width of the current block by the height of the current block is greater than or equal to 2 or less than or equal to ½), the rearrangement method that uses mirroring of the residual coefficients of the current block may be applied; when the ratio of the width to the height of the current block is less than 2 and greater than ½ (namely, when a value obtained by dividing the width of the current block by the height of the current block is less than 2 and greater than ½), the rearrangement method that rotates the residual coefficients of the current block by 180 degrees may be applied. Alternatively, for example, when the ratio of the width to the height of the current block is greater than or equal to 2 or less than or equal to ½ (namely, when a value obtained by dividing the width of the current block by the height of the current block is greater than or equal to 2 or less than or equal to ½), the rearrangement method that uses mirroring of the residual coefficients of the current block may be applied; when the ratio of the width to the height of the current block is less than 2 and greater than ½ (namely, when a value obtained by dividing the width of the current block by the height of the current block is less than 2 and greater than ½), the rearrangement method may not be applied to the residual coefficients of the current block. Meanwhile, for example, a process of determining a rearrangement method or whether to rearrange the current block based on the conditions described above may be performed only when the value of the transform skip flag of the current block is 1. In other words, when the value of the transform skip flag of the current block is 1, the rearrangement method or whether to rearrange the current block may be determined based on the ratio of the width to the height of the current block.

Alternatively, as still another example, when intra prediction is applied to a current block, a rearrangement method or whether to rearrange the current block may be determined based on an intra prediction mode for the current block. For example, when a prediction direction of the intra prediction mode for the current block is close to the horizontal direction or the vertical direction, a left reference sample or a top reference sample is mainly used for prediction, and a prediction error is distributed heavily along one reference sample direction. Therefore, an embodiment for determining a rearrangement method in consideration of this characteristic may be proposed. For example, when a prediction direction of the intra prediction mode for the current block is the horizontal direction, or the intra prediction mode for the current block mainly uses a left reference sample for prediction, the rearrangement method using a vertical flip may be applied. Similarly, when a prediction direction of the intra prediction mode for the current block is the vertical direction, or the intra prediction mode for the current block mainly uses a top reference sample for prediction, the rearrangement method using a horizontal flip may be applied. Meanwhile, for example, a process of determining a rearrangement method or whether to rearrange the current block based on the conditions described above may be performed only when the value of the transform skip flag of the current block is 1. In other words, when the value of the transform skip flag of the current block is 1, the rearrangement method or whether to rearrange the current block may be determined based on the intra prediction mode for the current block.

Alternatively, as yet still another example, a rearrangement method or whether to rearrange a current block may be determined based on high-level syntax within a bitstream transmitted from the encoding apparatus. For example, a flag indicating whether to apply rearrangement may be transmitted through high-level syntax such as the Sequence Parameter Set (SPS) and the Picture Parameter Set (PPS), and whether to apply rearrangement to the low-level syntax referencing the high-level syntax and a rearrangement method for the low-level syntax may be determined based on the flag. Meanwhile, for example, a process of determining a rearrangement method or whether to rearrange the current block based on the conditions described above may be performed only when the value of the transform skip flag of the current block is 1. In other words, when the value of the transform skip flag of the current block is 1, a flag indicating whether to apply rearrangement may be transmitted through high-level syntax such as the SPS and PPS, and the rearrangement method or whether to rearrange the current block may be determined based on the flag.

Alternatively, as still yet another example, a rearrangement method or whether to rearrange a current block may be determined based on a prediction mode of the current block. For example, an embodiment may be proposed, in which the residual rearrangement method is not used for the inter prediction mode where a residual signal is relatively less generated, but the rearrangement method is used only for a residual signal of a block predicted by the intra prediction mode. In other words, when inter prediction is applied to the current block, the rearrangement method for residual coefficients of the current block may not be applied; when intra prediction is applied to the current block, the rearrangement method for the residual coefficients of the current block may be applied. Meanwhile, for example, a process of determining a rearrangement method or whether to rearrange the current block based on the conditions described above may be performed only when the value of the transform skip flag of the current block is 1. In other words, when the value of the transform skip flag of the current block is 1, the rearrangement method or whether to rearrange the current block may be determined based on a prediction mode for the current block.

Alternatively, as further yet another example, a rearrangement method or whether to rearrange a current block may be determined based on whether quantization is applied. For example, the residual rearrangement method may not be performed for lossless coding where quantization is not applied, but the residual rearrangement method may be applied for lossy coding where quantization is applied. In other words, when quantization is not applied to the residual coefficients of the current block, the rearrangement method for the residual coefficients of the current block may not be applied while, when quantization is applied to the residual coefficients of the current block, the rearrangement method for the residual coefficients of the current block may be applied. Meanwhile, for example, a process of determining a rearrangement method or whether to rearrange the current block based on the conditions described above may be performed only when the value of the transform skip flag of the current block is 1. In other words, when the value of the transform skip flag of the current block is 1, the rearrangement method or whether to rearrange the current block may be determined based on whether quantization is applied to the residual coefficients of the current block.

Figure 15:
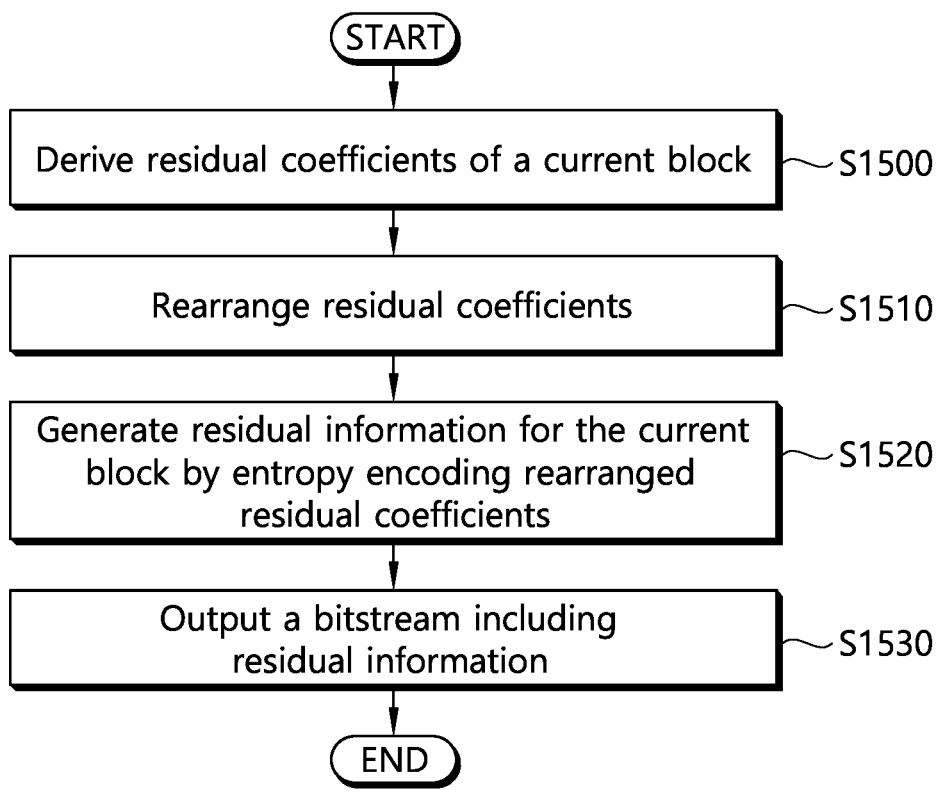
FIG. 15 illustrates an image encoding method by an encoding apparatus according to the present disclosure.

FIG. 15 illustrates an image encoding method by an encoding apparatus according to the present disclosure. The method disclosed in FIG. 15 may be performed by the encoding apparatus disclosed in FIG. 2. Specifically, for example, S1500 of FIG. 15 may be performed by the subtractor and the transformer of the encoding apparatus, S1510 may be performed by the residual rearrangement unit of the encoding apparatus, and S1520 to S1530 may be performed by the entropy encoder of the encoding apparatus. Also, although not shown in the figure, a process for deriving a prediction sample may be performed by the predictor of the encoding apparatus, and a process for deriving a residual sample for a current chroma block based on the original sample and the prediction sample for the current block may be performed by the subtractor of the encoding apparatus, and a process for deriving reconstructed samples for the current block based on the residual samples and prediction samples for the current block may be performed by the adder of the encoding apparatus.

The encoding apparatus derives the residual coefficients of the current block S1500. The encoding apparatus may determine whether to perform inter prediction or intra prediction on the current block and determine a specific inter prediction mode or a specific intra prediction mode based on the RD cost. According to the determined mode, the encoding apparatus may derive prediction samples for the current block and derive the residual samples through subtraction between the original samples and the prediction samples for the current block.

Afterward, the encoding apparatus may determine whether a transform is applied to the residual samples. When a transform is not applied to the residual samples, the encoding apparatus may derive the derived residual samples as the residual coefficients. Also, when a transform is applied to the residual samples, the encoding apparatus may perform a transform on the derived residual samples to derive the residual coefficients.

Meanwhile, the encoding apparatus may generate and encode a transform skip flag indicating whether to transform residual coefficients of the current block. Image information may include a transform skip flag for the current block. The transform skip flag may indicate whether to transform residual coefficients of the current block. In other words, the transform skip flag may indicate whether a transform has been applied to the residual coefficients. The syntax element indicating the transform skip flag may be the transform_skip_flag.

The encoding apparatus rearranges the residual coefficients S1510. For example, the encoding apparatus may rearrange the residual coefficients using various rearrangement methods. In other words, the encoding apparatus may move the residual coefficients from their derived positions to other positions using various rearrangement methods.

As one example, the encoding apparatus may rearrange the residual coefficients through a rearrangement method that uses a rotation of 180 degrees. Specifically, for example, the encoding apparatus may rearrange the residual coefficients of the current block to their symmetric positions with respect to the center of the current block.

Alternatively, as one example, the encoding apparatus may rearrange the residual coefficients through a rearrangement method using antidiagonal mirroring. Specifically, for example, the encoding apparatus may rearrange the residual coefficients of the current block to their symmetric positions with respect to an upward-right diagonal line of the current block. Here, the upward-right diagonal line may correspond to a diagonal line in an upward-right direction passing through the center of the current block.

Alternatively, as one example, the decoding apparatus may rearrange the residual coefficients through a rearrangement method using main diagonal mirroring. Specifically, for example, the encoding apparatus may rearrange the residual coefficients of the current block to their symmetric positions with respect to an upward-left diagonal line of the current block. Here, the upward-left diagonal line may correspond to a diagonal line in an upward-left direction passing through the center of the current block.

Alternatively, as one example, the encoding apparatus may rearrange the residual coefficients through a rearrangement method using a vertical flip. Specifically, for example, the encoding apparatus may rearrange the residual coefficients of the current block to their symmetric positions with respect to the vertical axis of the current block. Here, the vertical axis may correspond to the vertical line passing through the center of the current block.

Alternatively, as one example, the encoding apparatus may rearrange the residual coefficients through a rearrangement method using a horizontal flip. Specifically, for example, the encoding apparatus may rearrange the residual coefficients of the current block to their symmetric positions with respect to the horizontal axis of the current block. Here, the horizontal axis may correspond to the horizontal line passing through the center of the current block.

Alternatively, as one example, the encoding apparatus may rearrange the residual coefficients through a rearrangement method that derives a layer divided based on a distance from a reference sample of the current block and rearranges the residual coefficients to the positions in inverse raster order.

For example, the encoding apparatus may configure layers for the current block based on a distance from reference samples of the current block. Here, the reference samples may include top reference samples and left reference samples of the current block. For example, when the size of the current block is N×N, and the x component and the y component of the top-left sample position of the current block are 0, the left reference samples may be from $p[-1][0]$ to $p[-1][2N-1]$, and the top reference samples may be from $p[0][-1]$ to $p[2N-1][-1]$. When the size of the current block is N×N, the layers may include the first to the Nth layers. The N-th layer may be the last layer, where N may be equal to the value of the width or the height of the current block. For example, the first layer may include positions having a distance of 1 from the closest reference sample, the second layer may include positions having a distance of 2 from the closest reference sample, and the Nth layer may include positions with a distance of N from the closest reference sample.

Afterward, the encoding apparatus may scan the residual coefficients within the layers. For example, the encoding apparatus may scan the layers from the first layer to the N-th layer. Also, the residual coefficients within the scanned layer may be scanned based on a horizontal-first scan or a vertical-first scan.

For example, in the scanned layer, the residual coefficient at the top-left position may be scanned first in the right direction, and when positions in the vertical direction of the top-left position exist in the scanned layer, scanning may be performed in the downward direction, starting from the residual coefficient at a position adjacent to the lower side of the top-left position. Also, for example, in the scanned layer, the residual coefficient at the top-left position may be scanned first in the downward direction, and when positions in the horizontal direction of the top-left position exist in the scanned layer, scanning may be performed in the right direction, starting from the residual coefficient at a position adjacent to the right side of the top-left position.

Afterward, the encoding apparatus may rearrange the residual coefficients to the positions in inverse raster order within the current block according to the scanned order. In other words, the encoding apparatus may rearrange the residual coefficients of the current block from right to left and bottom to top according to the scanned order.

Alternatively, as one example, the encoding apparatus may rearrange the residual coefficients through a rearrangement method that derives a layer divided based on a distance from a reference sample of the current block and rearranges the residual coefficients to the positions in diagonal scan order.

For example, the encoding apparatus may configure layers for the current block based on a distance from reference samples of the current block. Here, the reference samples may include top reference samples and left reference samples of the current block. For example, when the size of the current block is N×N, and the x component and the y component of the top-left sample position of the current block are 0, the left reference samples may be from p[−1][0] to p[−1][2N−1], and the top reference samples may be from p[0][−1] to p[2N−1][−1]. When the size of the current block is N×N, the layers may include the first to the Nth layers. The N-th layer may be the last layer, where N may be equal to the value of the width or the height of the current block. For example, the first layer may include positions having a distance of 1 from the closest reference sample, the second layer may include positions having a distance of 2 from the closest reference sample, and the Nth layer may include positions with a distance of N from the closest reference sample.

Afterward, the encoding apparatus may scan the residual coefficients within the layers. For example, the encoding apparatus may scan the layers from the first layer to the N-th layer. Also, the residual coefficients within the scanned layer may be scanned based on a horizontal-first scan or a vertical-first scan.

For example, in the scanned layer, the residual coefficient at the top-left position may be scanned first in the right direction, and when positions in the vertical direction of the top-left position exist in the scanned layer, scanning may be performed in the downward direction, starting from the residual coefficient at a position adjacent to the lower side of the top-left position. Also, for example, in the scanned layer, the residual coefficient at the top-left position may be scanned first in the downward direction, and when positions in the horizontal direction of the top-left position exist in the scanned layer, scanning may be performed in the right direction, starting from the residual coefficient at a position adjacent to the right side of the top-left position.

Afterward, the encoding apparatus may rearrange the residual coefficients to the positions in the diagonal scan order within the current block according to the scanned order. In other words, the encoding apparatus may rearrange the residual coefficients of the current block from top-right to bottom-left and bottom-right to top-left according to the scanned order.

Alternatively, for example, the encoding apparatus may configure layers for the current block based on a distance from top reference samples of the current block. For example, when the size of the current block is N×N, and the x component and the y component of the top-left sample position of the current block are 0, the top reference samples may be from p[0][−1] to p[2N−1][−1]. When the size of the current block is N×N, the layers may include the first to the Nth layers. The N-th layer may be the last layer, where N may be equal to the value of the width or the height of the current block. For example, the first layer may include positions having a distance of 1 from the closest top reference sample, the second layer may include positions having a distance of 2 from the closest top reference sample, and the Nth layer may include positions with a distance of N from the closest top reference sample. In other words, the first layer may be the first row of the current block, the second layer may be the second row of the current block, and the N-th layer may be the N-th row of the current block.

Afterward, the encoding apparatus may scan the residual coefficients within the layers. For example, the encoding apparatus may scan the layers from the first layer to the N-th layer. Also, the residual coefficients within the scanned layer may be scanned in the right direction, starting from the residual coefficient at the top-left position.

Afterward, the encoding apparatus may rearrange the residual coefficients to the positions in the diagonal scan order within the current block according to the scanned order. In other words, the encoding apparatus may rearrange the residual coefficients of the current block from top-right to bottom-left and bottom-right to top-left according to the scanned order.

Alternatively, for example, the encoding apparatus may configure layers for the current block based on a distance from left reference samples of the current block. For example, when the size of the current block is N×N, and the x component and the y component of the top-left sample position of the current block are 0, the left reference samples may be from p[−1][0] to p[−1][2N−1]. When the size of the current block is N×N, the layers may include the first to the Nth layers. The N-th layer may be the last layer, where N may be equal to the value of the width or the height of the current block. For example, the first layer may include positions having a distance of 1 from the closest left reference sample, the second layer may include positions having a distance of 2 from the closest left reference sample, and the Nth layer may include positions with a distance of N from the closest left reference sample. In other words, the first layer may be the first column of the current block, the second layer may be the second column of the current block, and the N-th layer may be the N-th column of the current block.

Afterward, the encoding apparatus may scan the residual coefficients within the layers. For example, the encoding apparatus may scan the layers from the first layer to the N-th layer. Also, the residual coefficients within the scanned layer may be scanned in the downward direction, starting from the residual coefficient at the top-left position.

Afterward, the encoding apparatus may rearrange the residual coefficients to the positions in the diagonal scan order within the current block according to the scanned order. In other words, the encoding apparatus may rearrange the residual coefficients of the current block from top-right to bottom-left and bottom-right to top-left according to the scanned order.

Meanwhile, the encoding apparatus may determine whether to rearrange the residual coefficients based on various conditions. Alternatively, the encoding apparatus may derive a rearrangement method to be applied to the residual coefficients based on various conditions.

As one example, the encoding apparatus may generate a transform skip flag for the current block and determine whether to rearrange the residual coefficients based on the transform skip flag. The transform skip flag may indicate whether to transform the residual coefficients. For example, when the value of the transform skip flag is 1, it may be determined to rearrange the residual coefficients. In other words, when the value of the transform skip flag is 1, the encoding apparatus may rearrange the residual coefficients. On the other hand, when the value of the transform skip flag is 0, it may be determined not to rearrange the residual coefficients. In other words, when the value of the transform skip flag is 0, the encoding apparatus may not rearrange the residual coefficients.

Alternatively, as another example, whether to rearrange the residual coefficients may be determined based on the number of samples of the current block. For example, when the number of samples of the current block is less than a specific value, it may be determined to rearrange the residual coefficients. In other words, when the number of samples of the current block is less than a specific value, the encoding apparatus may rearrange the residual coefficients. On the other hand, when the number of samples of the current block is greater than or equal to a specific value, it may be determined not to rearrange the residual coefficients. In other words, when the number of samples of the current block is greater than or equal to a specific value, the encoding apparatus may not rearrange the residual coefficients. For example, the specific value may be 64.

Alternatively, for example, when the number of samples of the current block is less than 64, the encoding apparatus may rearrange the residual coefficients through a rearrangement method that uses a rotation of 180 degrees. When the number of samples of the current block is greater than or equal to 64, the encoding apparatus may not rearrange the residual coefficients.

Alternatively, as another example, the rearrangement method for the residual coefficients may be determined based on the number of samples of the current block.

For example, when the number of samples of the current block is less than 64, the encoding apparatus may rearrange the residual coefficients through the rearrangement method that rotates the residual coefficients by 180 degrees; when the number of samples of the current block is greater than or equal to 64, the encoding apparatus may rearrange the residual coefficients through the rearrangement method that uses mirroring of the residual coefficients. Alternatively, as another example, when the number of samples of the current block is less than 64, the encoding apparatus may rearrange the residual coefficients through one of the rearrangement methods described above while, when the number of samples of the current block is greater than or equal to 64, the encoding apparatus may not rearrange the residual coefficients.

Alternatively, as yet another example, whether to rearrange the residual coefficients may be determined based on the shape of the current block. For example, when the current block is a square block, it may be determined to rearrange the residual coefficients. In other words, when the current block is a square block, the encoding apparatus may rearrange the residual coefficients. When the current block is a non-square block, it may be determined not to rearrange the residual coefficients. In other words, when the current block is a non-square block, the encoding apparatus may not rearrange the residual coefficients.

Alternatively, as still another example, a rearrangement method for the residual coefficients may be determined based on the shape of the current block. For example, when the current block is a square block, the encoding apparatus may rearrange the residual coefficients through the rearrangement method that uses mirroring. On the other hand, when the current block is a non-square block, the encoding apparatus may rearrange the residual coefficients through the rearrangement method that rotates the residual coefficients by 180 degrees.

Alternatively, as yet still another example, whether to rearrange the residual coefficients may be determined based on the ratio of the width to the height of the current block. For example, when the ratio of the width to the height of the current block is greater than or equal to 2 or less than or equal to ½ (namely, when a value obtained by dividing the width of the current block by the height of the current block is greater than or equal to 2 or less than or equal to ½), the encoding apparatus may rearrange the residual coefficients through the rearrangement method that uses mirroring of the residual coefficients; when the ratio of the width to the height of the current block is less than 2 and greater than ½ (namely, when a value obtained by dividing the width of the current block by the height of the current block is less than 2 and greater than ½), the encoding apparatus may not rearrange the residual coefficients.

Alternatively, as still yet another example, the rearrangement method for the residual coefficients may be determined based on the ratio of the width to the height of the current block. For example, when the ratio of the width to the height of the current block is greater than or equal to 2 or less than or equal to ½ (namely, when a value obtained by dividing the width of the current block by the height of the current block is greater than or equal to 2 or less than or equal to ½), the encoding apparatus may rearrange the residual coefficients through the rearrangement method that uses mirroring of the residual coefficients; when the ratio of the width to the height of the current block is less than 2 and greater than ½ (namely, when a value obtained by dividing the width of the current block by the height of the current block is less than 2 and greater than ½), the encoding apparatus may rearrange the residual coefficients through the rearrangement method that rotates the residual coefficients by 180 degrees.

Alternatively, as further yet another example, whether to rearrange the residual coefficients may be determined based on an intra prediction mode for the current block. For example, when a prediction direction of the intra prediction mode for the current block is the horizontal direction, or when the intra prediction mode for the current block mainly uses a left reference sample for prediction, the encoding apparatus may rearrange the residual coefficients through the rearrangement method using a vertical flip but may not rearrange the residual coefficients for other cases. Similarly, when a prediction direction of the intra prediction mode for the current block is the vertical direction, or when the intra prediction mode for the current block mainly uses a top reference sample for prediction, the encoding apparatus may rearrange the residual coefficients through the rearrangement method using a vertical flip but may not rearrange the residual coefficients for other cases.

Alternatively, as further still another example, the rearrangement method for the residual coefficients may be determined based on an intra prediction mode for the current block. For example, when a prediction direction of the intra prediction mode for the current block is the horizontal direction, or when the intra prediction mode for the current block mainly uses a left reference sample for prediction, the encoding apparatus may rearrange the residual coefficients through the rearrangement method using a vertical flip. Similarly, when a prediction direction of the intra prediction mode for the current block is the vertical direction, or when the intra prediction mode for the current block mainly uses a top reference sample for prediction, the encoding apparatus may rearrange the residual coefficients through the rearrangement method using a vertical flip.

Alternatively, as further yet still another example, whether to rearrange the residual coefficients may be determined based on a flag indicating whether to rearrange the residual coefficients. For example, the encoding apparatus may generate a flag indicating whether to rearrange the residual coefficients and determine whether to rearrange the residual coefficients based on the flag. The flag indicating whether to rearrange the residual coefficients may be signaled through high-level syntax. For example, the flag indicating whether to rearrange the residual coefficients may be signaled through the Sequence Parameter Set (SPS) or the Picture Parameter Set (PPS).

Alternatively, as further still yet another example, the rearrangement method for the residual coefficients may be determined based on the information indicating a rearrangement method for the residual coefficients. For example, the encoding apparatus may generate information indicating a rearrangement method for the residual coefficients and determine whether to rearrange the residual coefficients based on the information. The flag indicating whether to rearrange the residual coefficients may be signaled through high-level syntax. For example, the information indicating a rearrangement method for the residual coefficients may be signaled through the Sequence Parameter Set (SPS) or the Picture Parameter Set (PPS).

Alternatively, as even yet another example, whether to rearrange the residual coefficients may be determined based on the prediction mode of the current block. For example, when the prediction mode of the current block is intra prediction, it may be determined to rearrange the residual coefficients. In other words, when the prediction mode of the current block is intra prediction, the encoding apparatus may rearrange the residual coefficients. Also, when the prediction mode of the current block is inter prediction, it may be determined not to rearrange the residual coefficients. In other words, when the prediction mode of the current block is inter prediction, the encoding apparatus may not rearrange the residual coefficients.

Alternatively, as even still another example, whether to rearrange the residual coefficients may be determined based on whether quantization is applied to the residual coefficients. For example, when quantization is applied to the residual coefficients, it may be determined to rearrange the residual coefficients. In other words, when quantization is applied to the residual coefficients, the encoding apparatus may rearrange the residual coefficients. Also, when quantization is not applied to the residual coefficients, it may be determined not to rearrange the residual coefficients. In other words, when quantization is not applied to the residual coefficients, the encoding apparatus may not rearrange the residual coefficients.

The encoding apparatus generates residual information for the current block by entropy encoding the rearranged residual coefficients S1520.

The encoding apparatus may derive residual information for the current block by entropy encoding the rearranged residual coefficients. For example, when quantization is applied to the residual coefficients, the encoding apparatus may quantize the rearranged residual coefficients and derive residual information for the current block by entropy encoding the quantized residual coefficients. Also, when quantization is not applied to the residual coefficients, the encoding apparatus may derive the residual information for the current block by entropy encoding the rearranged residual coefficients.

Also, for example, the residual information may include a transform skip flag for the current block. The transform skip flag may indicate whether to transform residual coefficients of the current block. In other words, the transform skip flag may indicate whether a transform has been applied to the residual coefficients. The syntax element indicating the transform skip flag may be the transform_skip_flag.

The encoding apparatus outputs a bitstream including the residual information S1530. For example, the encoding apparatus may output image information including the residual information in the form of a bitstream.

Meanwhile, for example, the image information may include prediction information for the current block. The prediction information may include information on inter prediction or intra prediction performed on the current block. For example, the prediction information may include prediction mode information related to the prediction procedure and information on the motion information (for example, when inter prediction is applied). Also, for example, the prediction information may include information indicating an intra prediction mode of the current block.

Meanwhile, the bitstream may be transmitted to the decoding apparatus through a network or a (digital) storage medium. Here, the network may include a broadcast network and/or a communication network, and the digital storage medium may include various types of storage media such as an USB disk, an SD, a CD, a DVD, a Bluray disk, an HDD, and an SDD.

Figure 16:
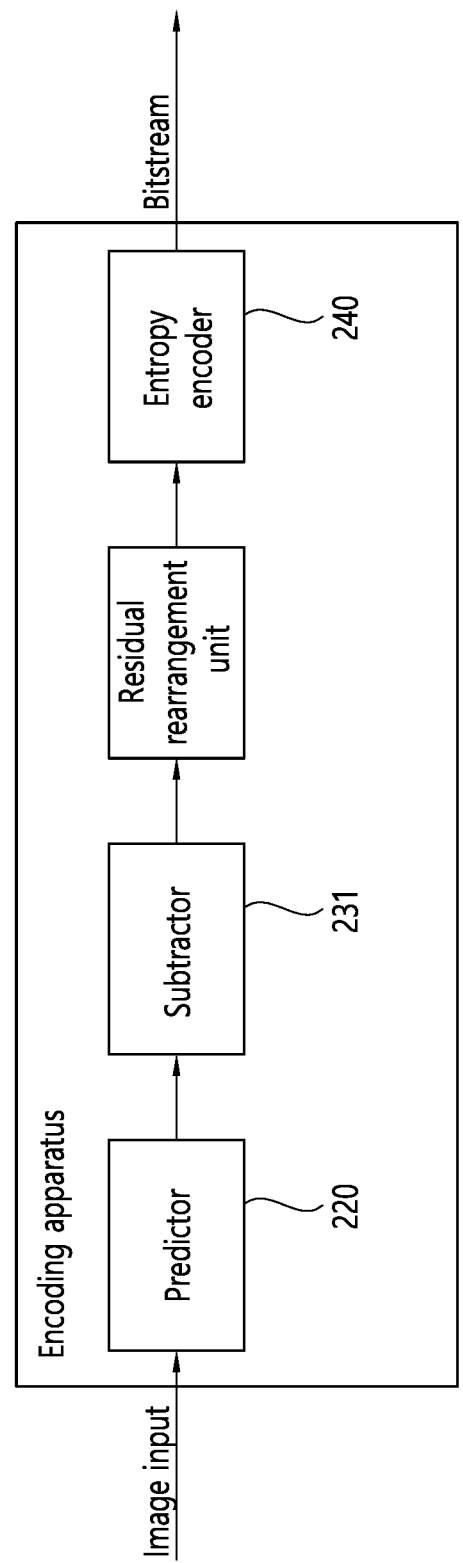
FIG. 16 illustrates an encoding apparatus performing an image encoding method according to the present disclosure.

FIG. 16 illustrates an encoding apparatus performing an image encoding method according to the present disclosure. The method disclosed in FIG. 15 may be performed by the encoding apparatus disclosed in FIG. 16. Specifically, for example, the subtractor and the transformer of the encoding apparatus of FIG. 16 may perform the S1500 step of FIG. 15; the residual rearrangement unit of the encoding apparatus of FIG. 16 may perform the S1510 step of FIG. 15; and the entropy encoder of the encoding apparatus of FIG. 16 may perform the S1520 to S1530 steps of FIG. 15. The residual rearrangement unit may be included in the transformer of the encoding apparatus. Also, although not shown in the figure, a process for deriving a prediction sample may be performed by the predictor of the encoding apparatus.

Figure 17:
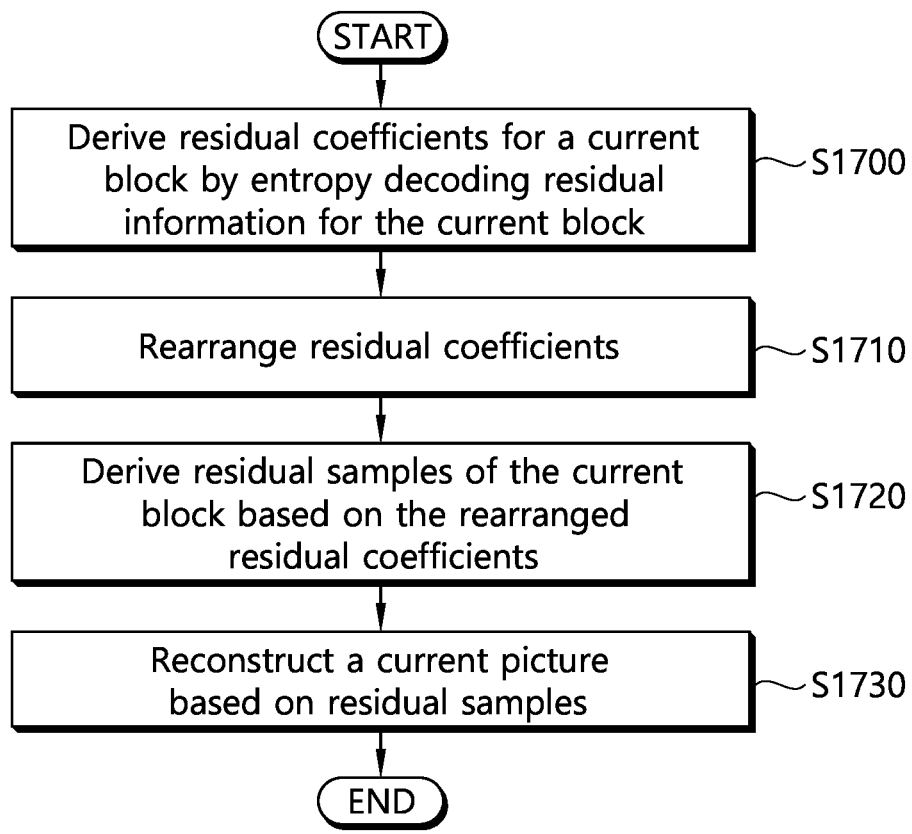
FIG. 17 illustrates an image decoding method by a decoding apparatus according to the present disclosure.

FIG. 17 illustrates an image decoding method by a decoding apparatus according to the present disclosure. The method disclosed in FIG. 17 may be performed by the decoding apparatus disclosed in FIG. 3. Specifically, for example, S1700 of FIG. 17 may be performed by the entropy decoder of the decoding apparatus, S1710 to S1720 may be performed by the residual rearrangement unit of the decoding apparatus, and S1730 may be performed by the adder of the decoding apparatus. Also, although not shown in the figure, a process for deriving a prediction sample may be performed by the predictor of the decoding apparatus.

The decoding apparatus may entropy decode the residual information for a current block to derive the residual coefficients for the current block S1700. The decoding apparatus may receive image information including residual information for the current block through a bitstream. Here, the current block may be a Coding Block (CB) or a Transform Block (TB).

The decoding apparatus may derive residual coefficients for the current block based on the received residual information. For example, the decoding apparatus may entropy decode the residual information to derive the residual coefficients for the current block. Alternatively, when quantization is applied to the residual coefficients, the decoding apparatus may entropy decode the residual information and dequantize the decoded coefficients to derive the residual coefficients for the current block.

Also, for example, the residual information may include a transform skip flag for the current block. The transform skip flag may indicate whether to transform residual coefficients of the current block. In other words, the transform skip flag may indicate whether a transform has been applied to the residual coefficients. The syntax element indicating the transform skip flag may be the transform_skip_flag.

Meanwhile, the image information may include prediction information for the current block. The prediction information may include information on inter prediction or intra prediction performed on the current block. The decoding apparatus may perform inter prediction or intra prediction for the current block based on the prediction information received through the bitstream and derive prediction samples of the current block. Specifically, for example, the prediction information may include information indicating an intra prediction mode of the current block. The decoding apparatus may derive the intra prediction mode of the current block based on the information and derive prediction samples of the current block based on the reference samples and the intra prediction mode of the current block.

The decoding apparatus rearranges the residual coefficients S1710. For example, the decoding apparatus may rearrange the residual coefficients through various rearrangement methods. In other words, the decoding apparatus may move the residual coefficients from where the residual coefficients are derived to other positions through the various rearrangement methods.

As one example, the decoding apparatus may rearrange the residual coefficients through a rearrangement method that uses a rotation of 180 degrees. Specifically, for example, the decoding apparatus may rearrange the residual coefficients of the current block to their symmetric positions with respect to the center of the current block.

Alternatively, as one example, the decoding apparatus may rearrange the residual coefficients through a rearrangement method using antidiagonal mirroring. Specifically, for example, the decoding apparatus may rearrange the residual coefficients of the current block to their symmetric positions with respect to an upward-right diagonal line of the current block. Here, the upward-right diagonal line may correspond to a diagonal line in an upward-right direction passing through the center of the current block.

Alternatively, as yet another example, the decoding apparatus may rearrange the residual coefficients through a rearrangement method using main diagonal mirroring. Specifically, for example, the decoding apparatus may rearrange the residual coefficients of the current block to their symmetric positions with respect to an upward-left diagonal line of the current block. Here, the upward-left diagonal line may correspond to a diagonal line in an upward-left direction passing through the center of the current block.

Alternatively, as one example, the decoding apparatus may rearrange the residual coefficients through a rearrangement method using a vertical flip. Specifically, for example, the decoding apparatus may rearrange the residual coefficients of the current block to their symmetric positions with respect to the vertical axis of the current block. Here, the vertical axis may correspond to the vertical line passing through the center of the current block.

Alternatively, as one example, the decoding apparatus may rearrange the residual coefficients through a rearrangement method using a horizontal flip. The decoding apparatus may rearrange the residual coefficients of the current block to their symmetric positions with respect to the horizontal axis of the current block. Here, the horizontal axis may correspond to the horizontal line passing through the center of the current block.

Alternatively, as one example, the decoding apparatus may rearrange the residual coefficients through a rearrangement method that derives a layer divided based on a distance from a reference sample of the current block and rearranges the residual coefficients in inverse raster order.

For example, the decoding apparatus may configure layers for the current block based on a distance from reference samples of the current block. Here, the reference samples may include top reference samples and left reference samples of the current block. For example, when the size of the current block is N×N, and the x component and the y component of the top-left sample position of the current block are 0, the left reference samples may be from $p[-1][0]$ to $p[-1][2N-1]$, and the top reference samples may be from $p[0][-1]$ to $p[2N-1][-1]$. When the size of the current block is N×N, the layers may include the first to the Nth layers. The N-th layer may be the last layer, where N may be equal to the value of the width or the height of the current block. For example, the first layer may include positions having a distance of 1 from the closest reference sample, the second layer may include positions having a distance of 2 from the closest reference sample, and the Nth layer may include positions with a distance of N from the closest reference sample.

Afterward, the decoding apparatus may scan the residual coefficients in inverse raster order. In other words, the decoding apparatus may scan the residual coefficients of the current block from right to left and bottom to top. Next, the decoding apparatus may rearrange the residual coefficients to the layers in the scanned order. Here, rearrangement of the residual coefficients may be performed from the first layer to the N-th layer. Also, the residual coefficients may be rearranged based on a horizontal-first scan or a vertical-first scan in the layer where the residual coefficients are rearranged.

For example, the residual coefficients may be rearranged first to the horizontal positions of the upper-left position from right to left in a layer where the residual coefficients are rearranged, and when there exist vertical positions of the upper-left position of the rearranged layer, the residual coefficients may be rearranged to the vertical positions of the upper-left position of the rearranged layer from top to bottom after the residual coefficients are rearranged in the horizontal positions. Alternatively, for example, the residual coefficients may be rearranged first to the vertical positions of the upper-left position from top to bottom in a layer where the residual coefficients are rearranged, and when there exist horizontal positions of the upper-left position of the rearranged layer, the residual coefficients may be rearranged to the horizontal positions of the upper-left position of the rearranged layer from left to right after the residual coefficients are rearranged in the vertical positions.

Alternatively, as one example, the decoding apparatus may rearrange the residual coefficients through a rearrangement method that derives a layer divided based on a distance from a reference sample of the current block and rearranges the residual coefficients in diagonal scan order.

For example, the decoding apparatus may configure layers for the current block based on a distance from reference samples of the current block. Here, the reference samples may include top reference samples and left reference samples of the current block. For example, when the size of the current block is N×N, and the x component and the y component of the top-left sample position of the current block are 0, the left reference samples may be from $p[-1][0]$ to $p[-1][2N-1]$, and the top reference samples may be from $p[0][-1]$ to $p[2N-1][-1]$. When the size of the current block is N×N, the layers may include the first to the Nth layers. The N-th layer may be the last layer, where N may be equal to the value of the width or the height of the current block. For example, the first layer may include positions having a distance of 1 from the closest reference sample, the second layer may include positions having a distance of 2 from the closest reference sample, and the Nth layer may include positions with a distance of N from the closest reference sample.

Afterward, the decoding apparatus may scan the residual coefficients in diagonal scan order. In other words, the decoding apparatus may scan the residual coefficients of the current block from top-right to bottom-left and bottom-right to top-left. Next, the decoding apparatus may rearrange the residual coefficients to the layers in the scanned order. Here, rearrangement of the residual coefficients may be performed from the first layer to the N-th layer. Also, the residual coefficients may be rearranged based on a horizontal-first scan or a vertical-first scan in the layer where the residual coefficients are rearranged.

For example, the residual coefficients may be rearranged first to the horizontal positions of the upper-left position from right to left in a layer where the residual coefficients are rearranged, and when there exist vertical positions of the upper-left position of the rearranged layer, the residual coefficients may be rearranged to the vertical positions of the upper-left position of the rearranged layer from top to bottom after the residual coefficients are rearranged in the horizontal positions. Alternatively, for example, the residual coefficients may be rearranged first to the vertical positions of the upper-left position from top to bottom in a layer where the residual coefficients are rearranged, and when there exist horizontal positions of the upper-left position of the rearranged layer, the residual coefficients may be rearranged to the horizontal positions of the upper-left position of the rearranged layer from left to right after the residual coefficients are rearranged in the vertical positions.

Alternatively, for example, the decoding apparatus may configure layers for the current block based on a distance from top reference samples of the current block. For example, when the size of the current block is N×N, and the x component and the y component of the top-left sample position of the current block are 0, the top reference samples may be from p[0][−1] to p[2N−1][−1]. When the size of the current block is N×N, the layers may include the first to the Nth layers. The N-th layer may be the last layer, where N may be equal to the value of the width or the height of the current block. For example, the first layer may include positions having a distance of 1 from the closest top reference sample, the second layer may include positions having a distance of 2 from the closest top reference sample, and the Nth layer may include positions with a distance of N from the closest top reference sample. In other words, the first layer may be the first row of the current block, the second layer may be the second row of the current block, and the N-th layer may be the N-th row of the current block.

Afterward, the decoding apparatus may scan the residual coefficients in diagonal scan order. In other words, the decoding apparatus may scan the residual coefficients of the current block from top-right to bottom-left and bottom-right to top-left. Next, the decoding apparatus may rearrange the residual coefficients to the layers in the scanned order. Here, rearrangement of the residual coefficients may be performed from the first layer to the N-th layer. Rearrangement of the residual coefficients may be performed from the first layer to the N-th layer, and the residual coefficients may be rearranged from right to left to the positions of the rearranged layer.

Alternatively, for example, the decoding apparatus may configure layers for the current block based on a distance from left reference samples of the current block. For example, when the size of the current block is N×N, and the x component and the y component of the top-left sample position of the current block are 0, the left reference samples may be from p[−1][0] to p[−1][2N−1]. When the size of the current block is N×N, the layers may include the first to the Nth layers. The N-th layer may be the last layer, where N may be equal to the value of the width or the height of the current block. For example, the first layer may include positions having a distance of 1 from the closest left reference sample, the second layer may include positions having a distance of 2 from the closest left reference sample, and the Nth layer may include positions with a distance of N from the closest left reference sample. In other words, the first layer may be the first column of the current block, the second layer may be the second column of the current block, and the N-th layer may be the N-th column of the current block.

Afterward, the decoding apparatus may scan the residual coefficients in diagonal scan order. In other words, the decoding apparatus may scan the residual coefficients of the current block from top-right to bottom-left and bottom-right to top-left. Next, the decoding apparatus may rearrange the residual coefficients to the layers in the scanned order. Here, rearrangement of the residual coefficients may be performed from the first layer to the N-th layer. Rearrangement of the residual coefficients may be performed from the first layer to the N-th layer, and the residual coefficients may be rearranged from top to bottom to the positions of the rearranged layer.

Meanwhile, the decoding apparatus may determine whether to rearrange the residual coefficients based on various conditions. Alternatively, the decoding apparatus may derive a rearrangement method to be applied to the residual coefficients based on various conditions.

As one example, the decoding apparatus may receive a transform skip flag for the current block and determine whether to rearrange the residual coefficients based on the transform skip flag. The transform skip flag may indicate whether to transform the residual coefficients. For example, when the value of the transform skip flag is 1, it may be determined to rearrange the residual coefficients. In other words, when the value of the transform skip flag is 1, the decoding apparatus may rearrange the residual coefficients. On the other hand, when the value of the transform skip flag is 0, it may be determined not to rearrange the residual coefficients. In other words, when the value of the transform skip flag is 0, the decoding apparatus may not rearrange the residual coefficients.

Alternatively, as another example, whether to rearrange the residual coefficients may be determined based on the number of samples of the current block. For example, when the number of samples of the current block is less than a specific value, it may be determined to rearrange the residual coefficients. In other words, when the number of samples of the current block is less than a specific value, the decoding apparatus may rearrange the residual coefficients. On the other hand, when the number of samples of the current block is greater than or equal to a specific value, it may be determined not to rearrange the residual coefficients. In other words, when the number of samples of the current block is greater than or equal to a specific value, the decoding apparatus may not rearrange the residual coefficients and derive the residual samples of the current block based on the residual coefficients. The specific value may be 64.

Alternatively, for example, when the number of samples of the current block is less than 64, the decoding apparatus may rearrange the residual coefficients through a rearrangement method that uses a rotation of 180 degrees. When the number of samples of the current block is greater than or equal to 64, the decoding apparatus may not rearrange the residual coefficients.

Alternatively, as another example, the rearrangement method for the residual coefficients may be determined based on the number of samples of the current block.

For example, when the number of samples of the current block is less than 64, the decoding apparatus may rearrange the residual coefficients through the rearrangement method that rotates the residual coefficients by 180 degrees; when the number of samples of the current block is greater than or equal to 64, the decoding apparatus may rearrange the residual coefficients through the rearrangement method that uses mirroring of the residual coefficients. Alternatively, as another example, when the number of samples of the current block is less than 64, the decoding apparatus may rearrange the residual coefficients through one of the rearrangement methods described above while, when the number of samples of the current block is greater than or equal to 64, the decoding apparatus may not rearrange the residual coefficients.

Alternatively, as yet another example, whether to rearrange the residual coefficients may be determined based on the shape of the current block. For example, when the current block is a square block, it may be determined to rearrange the residual coefficients. In other words, when the current block is a square block, the decoding apparatus may rearrange the residual coefficients. When the current block is a non-square block, it may be determined not to rearrange the residual coefficients. In other words, when the current block is a non-square block, the decoding apparatus may not rearrange the residual coefficients and derive the residual samples of the current block based on the residual coefficients.

Alternatively, as still another example, a rearrangement method for the residual coefficients may be determined based on the shape of the current block. For example, when the current block is a square block, the decoding apparatus may rearrange the residual coefficients through the rearrangement method that uses mirroring. On the other hand, when the current block is a non-square block, the decoding apparatus may rearrange the residual coefficients through the rearrangement method that rotates the residual coefficients by 180 degrees.

Alternatively, as yet still another example, whether to rearrange the residual coefficients may be determined based on the ratio of the width to the height of the current block. For example, when the ratio of the width to the height of the current block is greater than or equal to 2 or less than or equal to ½ (namely, when a value obtained by dividing the width of the current block by the height of the current block is greater than or equal to 2 or less than or equal to ½), the decoding apparatus may rearrange the residual coefficients through the rearrangement method that uses mirroring of the residual coefficients; when the ratio of the width to the height of the current block is less than 2 and greater than ½ (namely, when a value obtained by dividing the width of the current block by the height of the current block is less than 2 and greater than ½), the decoding apparatus may not rearrange the residual coefficients and derive the residual samples of the current block based on the residual coefficients.

Alternatively, as still yet another example, the rearrangement method for the residual coefficients may be determined based on the ratio of the width to the height of the current block. For example, when the ratio of the width to the height of the current block is greater than or equal to 2 or less than or equal to ½ (namely, when a value obtained by dividing the width of the current block by the height of the current block is greater than or equal to 2 or less than or equal to ½), the decoding apparatus may rearrange the residual coefficients through the rearrangement method that uses mirroring of the residual coefficients; when the ratio of the width to the height of the current block is less than 2 and greater than ½ (namely, when a value obtained by dividing the width of the current block by the height of the current block is less than 2 and greater than ½), the decoding apparatus may rearrange the residual coefficients through the rearrangement method that rotates the residual coefficients by 180 degrees.

Alternatively, as further yet another example, whether to rearrange the residual coefficients may be determined based on an intra prediction mode for the current block. For example, when a prediction direction of the intra prediction mode for the current block is the horizontal direction, or when the intra prediction mode for the current block mainly uses a left reference sample for prediction, the decoding apparatus may rearrange the residual coefficients through the rearrangement method using a vertical flip; for other cases, the decoding apparatus may not rearrange the residual coefficients for other cases but derive the residual samples of the current block based on the residual coefficients. Similarly, when a prediction direction of the intra prediction mode for the current block is the vertical direction, or when the intra prediction mode for the current block mainly uses a top reference sample for prediction, the decoding apparatus may rearrange the residual coefficients through the rearrangement method using a vertical flip; for other cases, the decoding apparatus may not rearrange the residual coefficients for other cases but derive the residual samples of the current block based on the residual coefficients.

Alternatively, as further still another example, the rearrangement method for the residual coefficients may be determined based on an intra prediction mode for the current block. For example, when a prediction direction of the intra prediction mode for the current block is the horizontal direction, or when the intra prediction mode for the current block mainly uses a left reference sample for prediction, the decoding apparatus may rearrange the residual coefficients through the rearrangement method using a vertical flip. Similarly, when a prediction direction of the intra prediction mode for the current block is the vertical direction, or when the intra prediction mode for the current block mainly uses a top reference sample for prediction, the decoding apparatus may rearrange the residual coefficients through the rearrangement method using a vertical flip.

Alternatively, as further yet still another example, whether to rearrange the residual coefficients may be determined based on a flag indicating whether to rearrange the residual coefficients received through high-level syntax. For example, the decoding apparatus may receive a flag indicating whether to rearrange the residual coefficients through the Sequence Parameter Set (SPS) or the Picture Parameter Set (PPS) and determine whether to rearrange the residual coefficients based on the flag.

Alternatively, as further still yet another example, the rearrangement method for the residual coefficients may be determined based on the information indicating a rearrangement method for the residual coefficients received through high-level syntax. For example, the decoding apparatus may receive information indicating a rearrangement method for the residual coefficients through the Sequence Parameter Set (SPS) or the Picture Parameter Set (PPS) and determine whether to rearrange the residual coefficients based on the information.

Alternatively, as even yet another example, whether to rearrange the residual coefficients may be determined based on the prediction mode of the current block. For example, when the prediction mode of the current block is intra prediction, it may be determined to rearrange the residual coefficients. In other words, when the prediction mode of the current block is intra prediction, the decoding apparatus may rearrange the residual coefficients. Also, when the prediction mode of the current block is inter prediction, it may be determined not to rearrange the residual coefficients. In other words, when the prediction mode of the current block is inter prediction, the decoding apparatus may not rearrange the residual coefficients but derive the residual samples of the current block based on the residual coefficients.

Alternatively, as even still another example, whether to rearrange the residual coefficients may be determined based on whether quantization is applied to the residual coefficients. For example, when quantization is applied to the residual coefficients, it may be determined to rearrange the residual coefficients. In other words, when quantization is applied to the residual coefficients, the decoding apparatus may rearrange the residual coefficients. Also, when quantization is not applied to the residual coefficients, it may be determined not to rearrange the residual coefficients. In other words, when quantization is not applied to the residual coefficients, the decoding apparatus may not rearrange the residual coefficients but derive the residual samples of the current block based on the residual coefficients.

The decoding apparatus derives the residual samples of the current block based on the rearranged residual coefficients S1720. The decoding apparatus may derive the residual samples of the current block based on the rearranged residual coefficients. As one example, when the value of the transform skip flag for the current block is 1, the decoding apparatus may derive the rearranged residual coefficients as the residual samples of the current block. Alternatively, when the value of the transform skip flag for the current block is 0, the decoding apparatus may derive the residual samples of the current block by inverse transform of the rearranged residual coefficients.

The decoding apparatus reconstructs a current picture based on the residual samples S1730. For example, the decoding apparatus may perform inter prediction or intra prediction for the current block based on the prediction information received through a bitstream, derive prediction samples, and generate the reconstructed picture through addition of the prediction samples and the residual samples. Also, for example, the prediction information may include information indicating an intra prediction mode of the current block. The decoding apparatus may derive the intra prediction mode of the current block based on the information indicating the intra prediction mode of the current block and derive prediction samples of the current block based on the reference samples and the intra prediction mode of the current block. The reference samples may include top reference samples and left reference samples of the current block. For example, when the size of the current block is N×N, and the x component and the y component at the top-left sample position of the current block are 0, the left reference samples may be from p[−1][0] to p[−1][2N−1], and the top reference samples may be from p[0][−1] to p[2N−1][−1].

Afterward, depending on the needs, to improve the subjective/objective image quality, an in-loop filtering procedure such as deblocking filtering and an SAO and/or ALF procedure may be applied to the reconstructed picture as described above.

Figure 18:
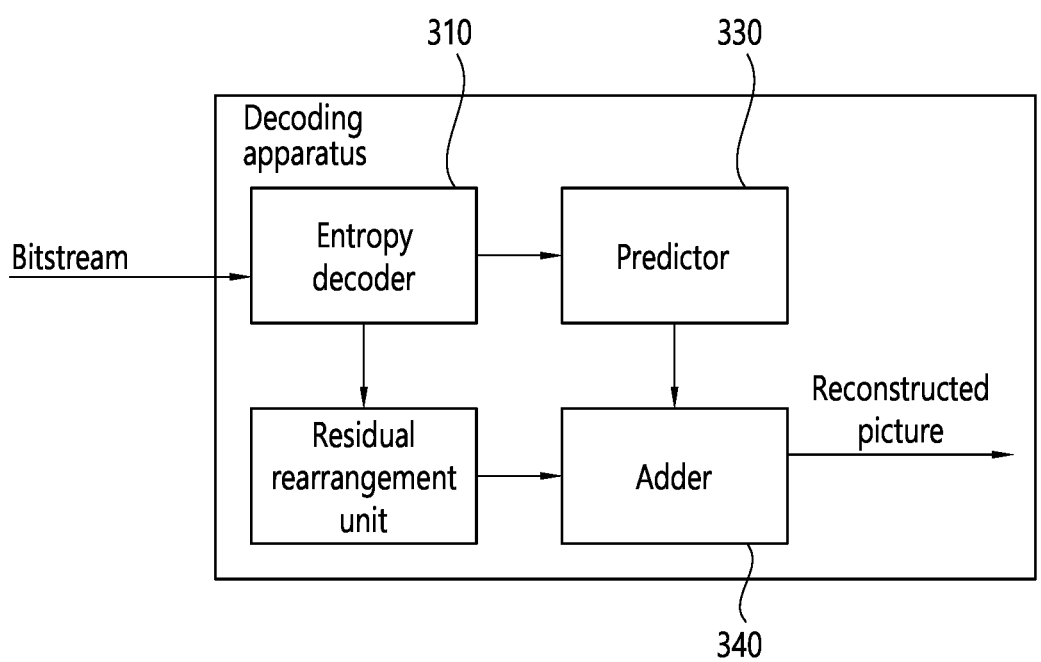
FIG. 18 illustrates a decoding apparatus performing an image decoding method according to the present disclosure.

FIG. 18 illustrates a decoding apparatus performing an image decoding method according to the present disclosure. The method disclosed in FIG. 17 may be performed by the decoding apparatus disclosed in FIG. 18. Specifically, for example, the entropy decoder of the decoding apparatus of FIG. 18 may perform the S1700 step of FIG. 17, the residual rearrangement unit of the decoding apparatus of FIG. 18 may perform the S1720 step of FIG. 17, and the adder of the decoding apparatus of FIG. 18 may perform the S1730 step of FIG. 17. The residual rearrangement unit may be included in the inverse transformer of the decoding apparatus. Also, although not shown in the figure, a process for deriving a prediction sample may be performed by the predictor of the decoding apparatus of FIG. 18.

According to the present disclosure, efficiency of residual coding may be improved.

Also, according to the present disclosure, residual coefficients are rearranged and coded considering the lack of correlation between residual coefficients in the pixel domain in which a transformation process is not performed, through which residual coding efficiency may be improved.

Different from the residual coefficients having a high correlation in the transform domain in which a transform is applied, the residual coefficients to which the transform is not applied may have a low correlation. Therefore, in this case, coding may be so performed to rearrange residual coefficients having a large value in the top-left area, through which residual information may be transmitted in a more efficient manner. Also, since a method for scanning the residual coefficients is not changed, existing coding tools may still be utilized.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 19:
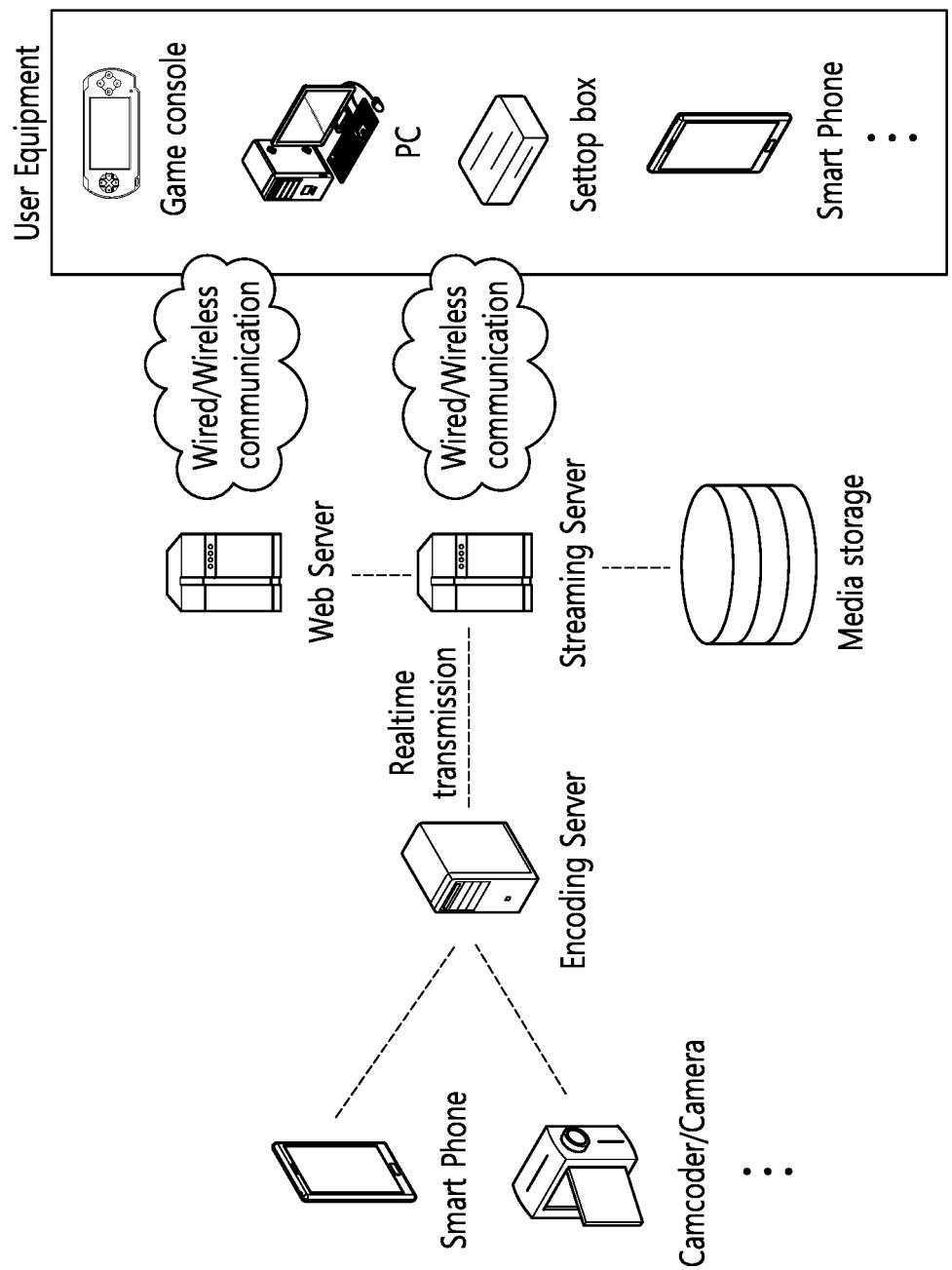
FIG. 19 illustrates a structural diagram of a contents streaming system to which the present disclosure is applied.

FIG. 19 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, comprising:
    deriving 1D array residual coefficients for a current block by entropy decoding residual information for the current block;
    deriving 2D array residual coefficients by scanning the 1D array residual coefficients in inverse raster order;
    configuring layers for the current block based on distances from reference samples of the current block;
    rearranging the 2D array residual coefficients in the layers in a scanned order;
    deriving residual samples of the current block based on the rearranged 2D residual coefficients; and
    reconstructing a current picture based on the residual samples,
    wherein the reference samples include top reference samples and left reference samples of the current block.

2. The method of claim 1, wherein rearrangement of the 2D array residual coefficients is performed from a first layer to an N-th layer,
    the 2D residual coefficients are rearranged first to horizontal positions of an upper-left position from right to left in a rearranged layer, and
    when there exist vertical positions of the upper-left position of the rearranged layer, the 2D array residual coefficients are rearranged to the vertical positions of the upper-left position of the rearranged layer from top to bottom after the 2D array residual coefficients are rearranged in the horizontal positions.

3. The method of claim 1, further comprising:
    receiving a transform skip flag for the current block; and
    determining whether to rearrange the 2D array residual coefficients based on the transform skip flag, wherein the transform skip flag indicates whether to transform the 2D array residual coefficients.

4. The method of claim 3, wherein, when a value of the transform skip flag is 1, the 2D array residual coefficients are rearranged.

5. An image encoding method performed by an encoding apparatus, comprising:
    deriving 2D array residual coefficients of a current block;
    configuring layers for the current block based on distances from reference samples of the current block;
    rearranging the 2D array residual coefficients in the layers in a scanned order;
    deriving 1D array residual coefficients by scanning the 2D array residual coefficients in raster order;
    generating residual information for the current block by entropy encoding the 1D array residual coefficients; and
    outputting a bitstream including the residual information,
    wherein the reference samples include top reference samples and left reference samples of the current block.

6. A non-transitory computer-readable storage medium storing a bitstream generated by a method, the method comprising:
    deriving 2D array residual coefficients of a current block;
    configuring layers for the current block based on distances from reference samples of the current block;
    rearranging the 2D array residual coefficients in the layers in a scanned order;
    deriving 1D array residual coefficients by scanning the 2D array residual coefficients in raster order;
    generating residual information for the current block by entropy encoding the 1D array residual coefficients; and
    generating the bitstream including the residual information,
    wherein the reference samples include top reference samples and left reference samples of the current block.

* * * * *